United States Patent
Takashima

(10) Patent No.: US 10,277,802 B2
(45) Date of Patent: Apr. 30, 2019

(54) FOCUSING CONTROL DEVICE, FOCUSING CONTROL METHOD, FOCUSING CONTROL PROGRAM, LENS DEVICE, AND IMAGING DEVICE

(71) Applicant: FUJIFILM Corporation, Tokyo (JP)

(72) Inventor: Eisuke Takashima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/937,874

(22) Filed: Mar. 28, 2018

(65) Prior Publication Data

US 2018/0220059 A1   Aug. 2, 2018

Related U.S. Application Data

(63) Continuation of application No. PCT/JP2016/077722, filed on Sep. 20, 2016.

(30) Foreign Application Priority Data

Sep. 30, 2015 (JP) .................. 2015-194238

(51) Int. Cl.
*H04N 5/232* (2006.01)
*H04N 9/04* (2006.01)
(Continued)

(52) U.S. Cl.
CPC .......... *H04N 5/23212* (2013.01); *G02B 7/28* (2013.01); *G02B 7/34* (2013.01); *G03B 13/36* (2013.01);
(Continued)

(58) Field of Classification Search
None
See application file for complete search history.

(56) References Cited

U.S. PATENT DOCUMENTS 5,555,068 A   9/1996 Utagawa
7,738,028 B2 *   6/2010 Nakahara .................. G02B 7/08
                                                                    348/353

(Continued)

FOREIGN PATENT DOCUMENTS

JP   H07181367   7/1995
JP   2002207160  7/2002
(Continued)

OTHER PUBLICATIONS

"International Search Report (Form PCT/ISA/210)" of PCT/JP2016/077722, dated Dec. 27, 2016, with English translation thereof, pp. 1-5.
"International Preliminary Report on Patentability (Form PCT/IPEA/409) of PCT/JP2016/077722,", dated Jun. 6, 2017, with English translation thereof, pp. 1-12.

*Primary Examiner* — Mark T Monk
(74) *Attorney, Agent, or Firm* — JCIPRNET

(57) ABSTRACT

A focusing control device includes: a plurality of signal detection sections that receives luminous fluxes passing through an imaging optical system including a focus lens capable of moving in an optical axis direction in a first range and detects signals corresponding to light reception amounts; a movement allowable range control unit that controls a movement allowable range in which movement of the focus lens set in the first range is allowed; and a lens driving control unit that moves the focus lens within the movement allowable range controlled by the movement allowable range control unit based on a signal group output from the plurality of signal detection sections.

5 Claims, 21 Drawing Sheets

(51) Int. Cl.
*G02B 7/28* (2006.01)
*G02B 7/34* (2006.01)
*G03B 13/36* (2006.01)
*G03B 15/00* (2006.01)
*H04N 5/369* (2011.01)

(52) U.S. Cl.
CPC ......... *G03B 15/00* (2013.01); *H04N 5/23218* (2018.08); *H04N 5/232122* (2018.08); *H04N 5/232125* (2018.08); *H04N 5/36961* (2018.08); *H04N 9/04557* (2018.08)

(56) References Cited

U.S. PATENT DOCUMENTS

| | | |
|---|---|---|
| 2006/0008265 A1 | 1/2006 | Ito |
| 2009/0074394 A1 | 3/2009 | Ito |
| 2015/0022710 A1 | 1/2015 | Miyajima |

FOREIGN PATENT DOCUMENTS

| | | |
|---|---|---|
| JP | 2006053545 | 2/2006 |
| JP | 2011-091664 | 5/2011 |
| JP | 2011-109323 | 6/2011 |
| JP | 2014-126858 | 7/2014 |
| JP | 2014-132321 | 7/2014 |
| JP | 2015022157 | 2/2015 |

\* cited by examiner

FOCUSING CONTROL DEVICE, FOCUSING CONTROL METHOD, FOCUSING CONTROL PROGRAM, LENS DEVICE, AND IMAGING DEVICE

CROSS REFERENCE TO RELATED APPLICATION

This is a continuation of International Application No. PCT/JP2016/077722 filed on Sep. 20, 2016, and claims priority from Japanese Patent Application No. 2015-194238 filed on Sep. 30, 2015, the entire disclosures of which are incorporated herein by reference.

BACKGROUND OF THE INVENTION

1. Field of the Invention

The present invention relates to a focusing control device, a focusing control method, a computer readable medium storing a focusing control program, a lens device, and an imaging device.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a mobile phone such as a smartphone. The information devices having an imaging function described above are referred to as imaging devices.

In these imaging devices, as a focusing control method which focuses on a main subject, a contrast auto focus (AF) method or a phase difference AF method is employed. Since high-speed processing is able to be performed, the phase difference AF method is a method that is particularly effective in a case where a moving image is captured by continuously imaging a subject by the imaging element.

In the imaging device, in a case where a scene on which the subject violently moves like sports is captured, it is necessary to continuously perform focusing control in accordance with the movement of the subject.

JP1995-181367A (JP-H7-181367A) discloses an imaging device that prevents a subject other than a target subject desired to be in focus from being in focus by causing a focus lens not to be driven in a case where a difference between a defocus amount acquired in an arbitrary point of time and a defocus amount acquired immediately before this point of time is large in a mode in which focusing control is continuously performed.

JP2011-109323A discloses a system capable of manually switching a mode in which an area as a calculation target of an AF evaluation value to be used for determining a focusing position automatically tracks the subject and a mode in which this area does not automatically track the subject.

SUMMARY OF THE INVENTION

According to the technology disclosed in JP1995-181367A (JP-H7-181367A), it is possible to prevent the subject other than the target subject from being in focus. However, since a change of the defocus amount is large in a case where the target subject approaches or goes away at a high speed, the target subject is out of focus, and thus, imaging is not able to be performed as intended.

The system disclosed in JP2011-109323A has the mode in which the area as the calculation target of the AF evaluation value automatically tracks the subject, but does not consider the aforementioned problem in this mode.

The invention has been made in view of such circumstances, and an object of the invention is to provide a focusing control device, a focusing control method, a computer readable medium storing a focusing control program, a lens device, and an imaging device capable of continuing to focus on a target subject with a simple configuration.

A focusing control device according to the invention comprises a plurality of signal detection sections that receives luminous fluxes passing through an imaging optical system including a focus lens capable of moving in an optical axis direction in a first range and detects signals corresponding to light reception amounts, a movement allowable range control unit that controls a movement allowable range in which movement of the focus lens set in the first range is allowed, and a lens driving control unit that moves the focus lens within the movement allowable range controlled by the movement allowable range control unit based on a signal group output from the plurality of signal detection sections.

A focusing control method according to the invention is a focusing control method of controlling a position of a focus lens capable of moving in an optical axis direction in a first range by using a plurality of signal detection sections which receives luminous fluxes passing through an imaging optical system including the focus lens and detects signals corresponding to light reception amounts. The method comprises a movement allowable range control step of controlling a movement allowable range in which movement of the focus lens set in the first range is allowed, and a lens driving control step of moving the focus lens within the movement allowable range controlled in the movement allowable range control step based on a signal group output from the plurality of signal detection sections.

A focusing control program according to the invention causes a computer to perform a focusing control method of controlling a position of a focus lens capable of moving in an optical axis direction in a first range by using a plurality of signal detection sections which receives luminous fluxes passing through an imaging optical system including the focus lens and detects signals corresponding to light reception amounts. The method comprises a movement allowable range control step of controlling a movement allowable range in which movement of the focus lens set in the first range is allowed, and a lens driving control step of moving the focus lens within the movement allowable range controlled in the movement allowable range control step based on a signal group output from the plurality of signal detection sections.

A lens device according to the invention comprises the focusing control device, and an imaging optical system including a focus lens for causing light rays to be incident on the plurality of signal detection sections.

An imaging device according to the invention comprises the focusing control device.

According to the invention, it is possible to provide a focusing control device, a focusing control method, a focusing control program, a lens device, and an imaging device capable of continuing to focus on a target subject with a simple configuration.

DESCRIPTION OF THE PREFERRED EMBODIMENTS

Figure 1:
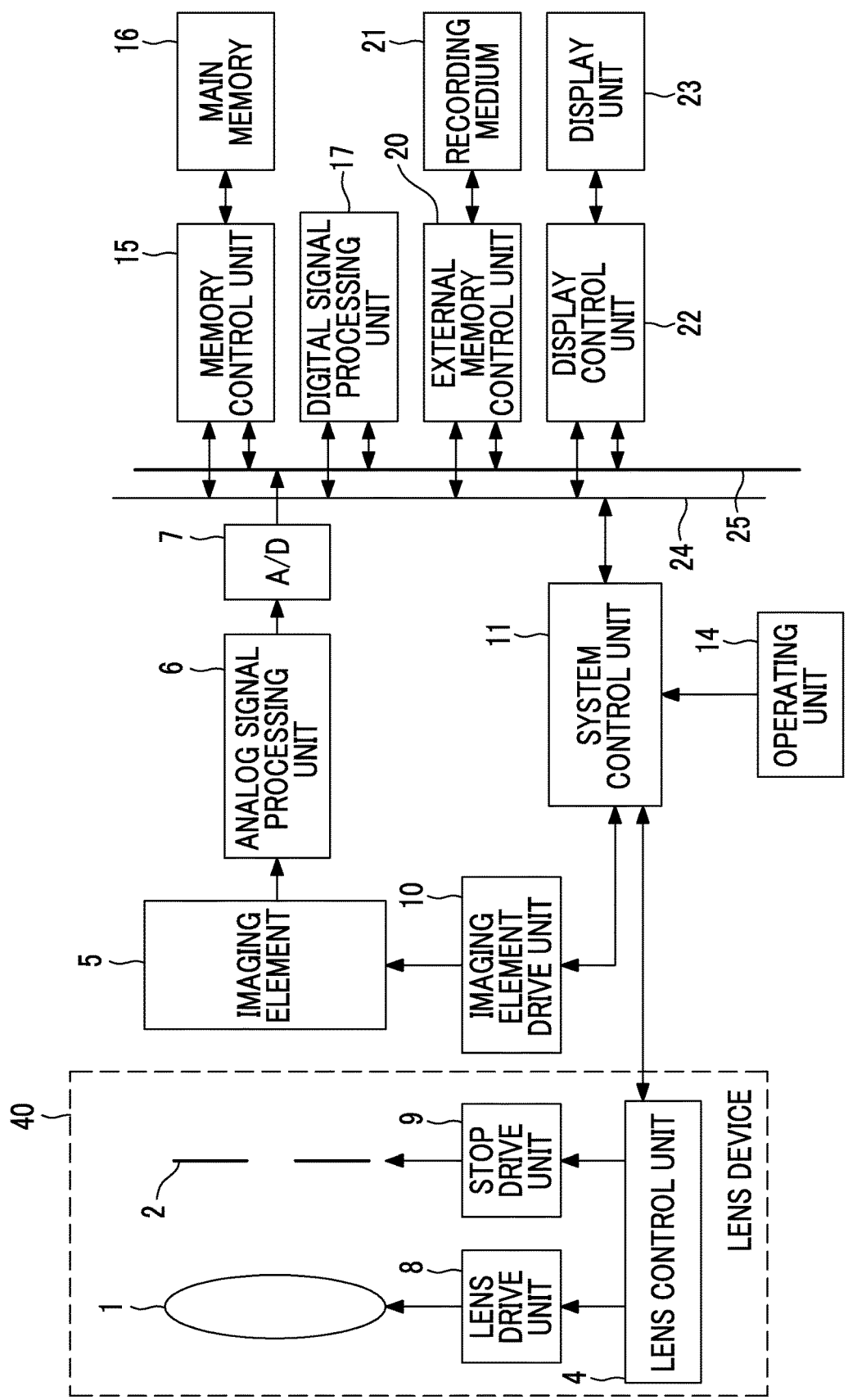
FIG. 1 is a diagram showing the schematic configuration of a digital camera as an imaging device for describing an embodiment of the invention.

Hereinafter, an embodiment of the invention will be described by referring to the drawings.

FIG. 1 is a diagram showing the schematic configuration of a digital camera as an imaging device for describing an embodiment of the invention.

The digital camera shown in FIG. 1 includes a lens device 40 that includes an imaging lens 1 including a focus lens for focus adjustment and a zoom lens for zoom magnification change, a stop 2, a lens control unit 4, a lens drive unit 8, a stop drive unit 9.

Although it has been described in the present embodiment that the lens device 40 is detachably attached to a digital camera main body, the lens device may be fixed to the digital camera main body.

The imaging lens 1 and the stop 2 constitute an imaging optical system, and the imaging optical system includes at least a focus lens. The focus lens is a lens for adjusting a focus of the imaging optical system, and is composed of a single lens or a plurality of lenses.

The focus lens moves in an optical axis direction of the imaging optical system in a range (that is, a mechanical drive limit) from a minimum object distance (MOD) end to an infinity (INF) end, and, thus, the focus adjustment is performed. The range from the MOD end (a side close to the imaging optical system) to the INF end (a side far away from the imaging optical system) in which the focus lens is driven constitutes a first range.

The lens control unit 4 of the lens device 40 is able to communicate with a system control unit 11 of the digital camera main body in a wired or wireless manner. The lens control unit 4 drives the focus lens or the zoom lens included in the imaging lens 1 through the lens drive unit 8 or drives the stop 2 through the stop drive unit 9 according to a command from the system control unit 11.

The digital camera main body includes an imaging element 5 which images a subject through the imaging optical system, such as a CCD type or CMOS type image sensor, an analog signal processing unit 6 which is connected to an output of the imaging element 5 and performs analog signal processing such as correlative double sampling processing, and an analog-to-digital conversion circuit 7 which converts the analog signal output from the analog signal processing unit 6 into a digital signal. The analog signal processing unit 6 and the analog-to-digital conversion circuit 7 are controlled by the system control unit 11. The analog signal processing unit 6 and the analog-to-digital conversion circuit 7 may be built in the imaging element 5.

The system control unit 11 that generally controls the entire electric control system of the digital camera drives the imaging element 5 through an imaging element drive unit 10, and outputs a subject image captured through the lens device 40, as captured image signals. A command signal from a user is input to the system control unit 11 through an operating unit 14.

The system control unit 11 includes a processor and a memory such as a random access memory (RAM) or a read only memory (ROM). The system control unit 11 realizes functions to be described below by executing a focusing control program stored in the ROM.

The electric control system of the digital camera includes the main memory 16, a memory control unit 15 which is connected to the main memory 16, a digital signal processing unit 17 which generates captured image data by performing interpolation calculation, gamma correction calculation, RGB/YC conversion processing, and the like on the captured image signals output from the analog-to-digital conversion circuit 7, an external memory control unit 20 to which a detachable recording medium 21 is connected, and a display control unit 22 to which a display unit 23 mounted on a camera rear surface or the like is connected.

The memory control unit 15, the digital signal processing unit 17, the external memory control unit 20, and the display control unit 22 are connected to one another by a control bus 24 and a data bus 25, and are controlled according to commands from the system control unit 11.

Figure 2:
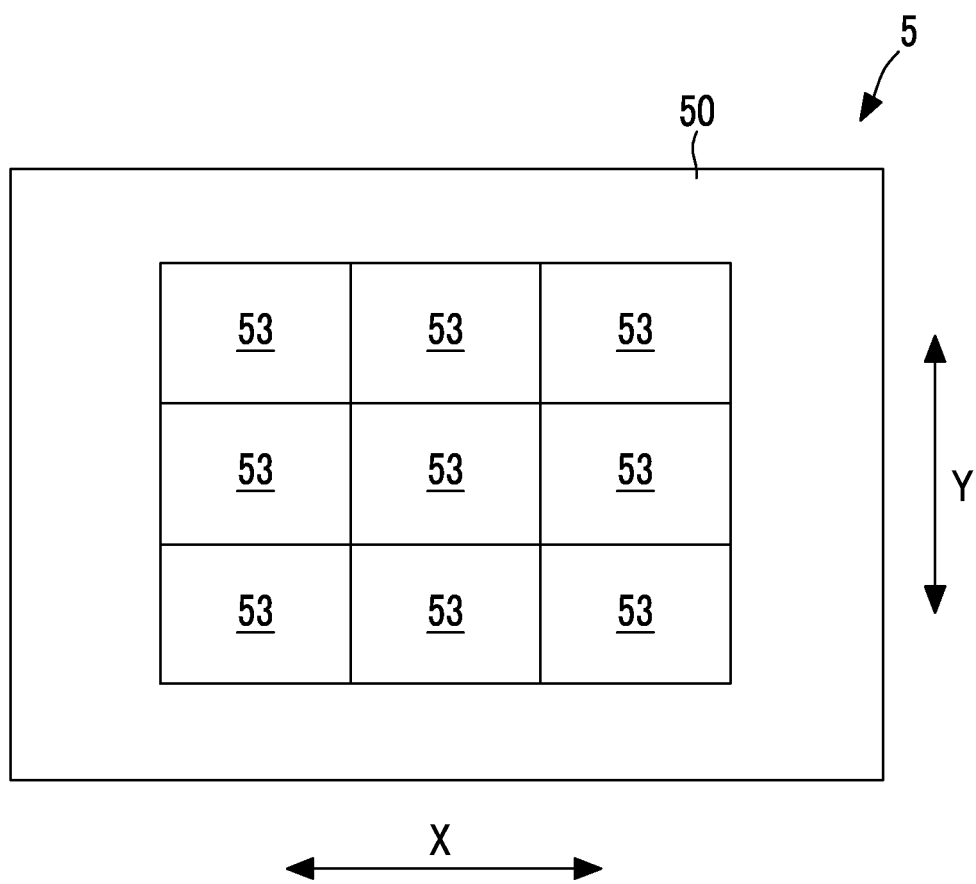
FIG. 2 is a schematic plan view showing the entire configuration of an imaging element 5 mounted on the digital camera shown in FIG. 1.

FIG. 2 is a schematic plan view showing the entire configuration of the imaging element 5 mounted on the digital camera shown in FIG. 1.

The imaging element 5 includes a light reception surface 50 on which a plurality of pixels arranged in a two-dimensional shape in a row direction X which is one direction and a column direction Y perpendicular to the row direction X are arranged. Nine focus detection areas 53 that are areas as targets to be in focus are formed on the light reception surface 50 in the example of FIG. 2.

The focus detection area 53 is an area including imaging pixels and phase difference detection pixels, as pixels.

Only the imaging pixels are arranged in portions other than focus detection areas 53 on the light reception surface 50. The focus detection areas 53 may be formed on the light reception surface 50 without gaps.

Figure 3:
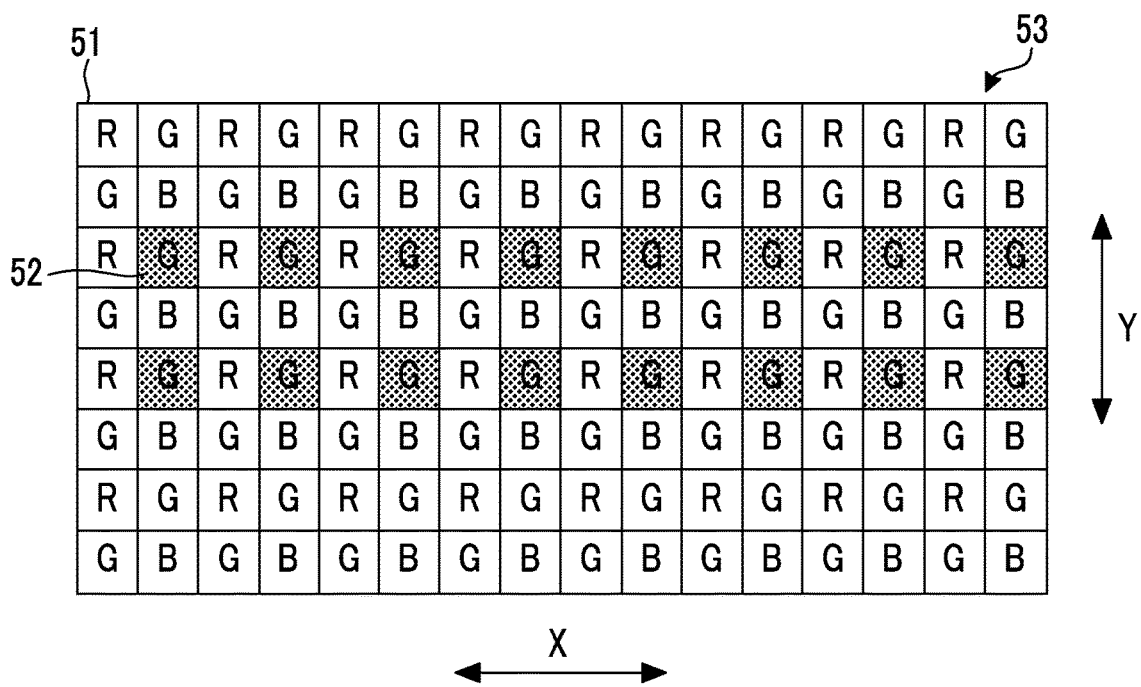
FIG. 3 is a partial enlarged view of one focus detection area 53 shown in FIG. 2.

FIG. 3 is a partial enlarged view of one focus detection area 53 shown in FIG. 2.

Pixels 51 are arranged in a two-dimensional shape in the focus detection area 53. The pixel 51 includes a photoelectric conversion section such as a photodiode and a color filter formed in the photoelectric conversion section.

In FIG. 3, the pixels 51 (referred to as R pixels 51) including the color filters (R filters) that transmit red light are assigned a character of "R", the pixels 51 (referred to as G pixels 51) including the color filters (G filters) that transmit green light are assigned a character of "G", and the pixels 51 (referred to as B pixels 51) including the color filters (B filters) that transmit blue light are assigned a character of "B". The arrangement of the color filters is a Bayer array on the entire light reception surface 50.

In the focus detection area 53, some (hatched pixels 51 in FIG. 3) of the G pixels 51 are phase difference detection pixels 52. In the example of FIG. 3, the G pixels 51 in an arbitrary pixel row among the pixel rows including the R pixels 51 and the G pixels 51 and G pixels 51 which are closest to the G pixels 51 in the column direction Y and have the same color as that of the G pixels are the phase difference detection pixels 52.

Figure 4:
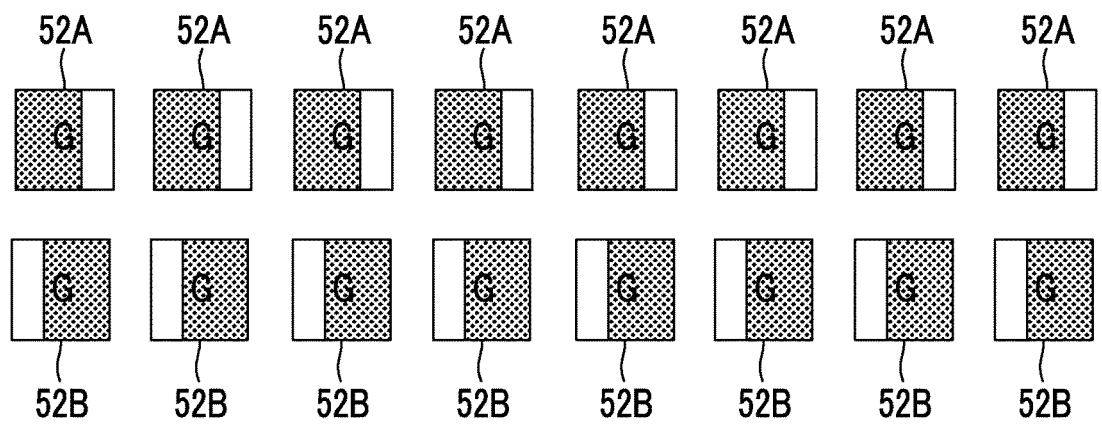
FIG. 4 is a diagram showing only phase difference detection pixels 52 shown in FIG. 3.

FIG. 4 is a diagram showing only the phase difference detection pixels 52 shown in FIG. 3.

As shown in FIG. 4, the phase difference detection pixels 52 includes two kinds of pixels such as phase difference detection pixels 52A and phase difference detection pixels 52B.

The phase difference detection pixel 52A is a first signal detection section which receives one of a pair of luminous fluxes passing through different portions arranged in one direction of a pupil region of the imaging lens 1, and detects a signal corresponding to a light reception amount.

The phase difference detection pixel 52B is a second signal detection section which receives the other one of the pair of luminous fluxes, and detects a signal corresponding to a light reception amount.

In the focus detection area 53, the plurality of pixels 51 other than the phase difference detection pixels 52A and 52B is the imaging pixels, and the imaging pixels receive a pair of luminous fluxes passing through the imaging lens 1, and detect signals corresponding to light reception amounts.

A light shielding film is formed on the photoelectric conversion sections of the pixels 51, and openings that prescribe light reception areas of the photoelectric conversion sections are formed in the light shielding film.

A center of the opening of the imaging pixel 51 matches a center of the photoelectric conversion section of the imaging pixel 51. In contrast, the center of the opening (a white portion of FIG. 4) of the phase difference detection pixel 52A is shifted to the right side from the center of the photoelectric conversion section of the phase difference detection pixel 52A. The center of the opening (a white portion in FIG. 4) of the phase difference detection pixel 52B is shifted to the left side from the center of the photoelectric conversion section of the phase difference detection pixel 52B. The right side mentioned herein is one side in the row direction X shown in FIG. 3, and the left side is the other side in the row direction X.

Figure 5:
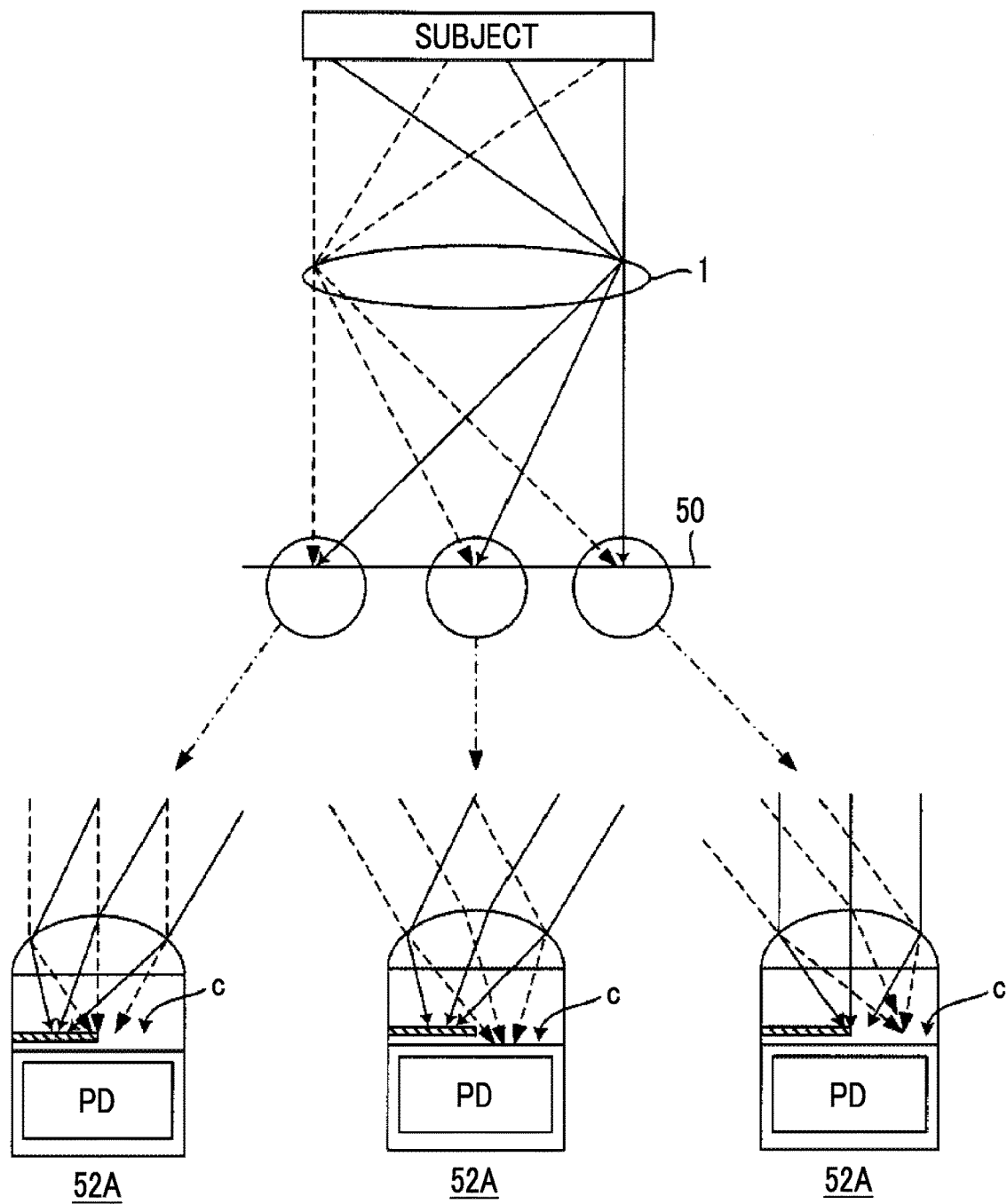
FIG. 5 is a diagram showing a cross-sectional configuration of a phase difference detection pixel 52A.

FIG. 5 is a diagram showing a cross-sectional configuration of the phase difference detection pixel 52A. As shown in FIG. 5, an opening c of the phase difference detection pixel 52A is shifted to the right side from the photoelectric conversion section (PD). As shown in FIG. 5, the one side of the photoelectric conversion section is covered with the light shielding film, and thus, light rays incident from a side opposite to the side covered with the light shielding film are selectively shielded.

With this configuration, it is possible to measure a phase difference amount between images captured by these two pixel groups, which include one pixel group including the phase difference detection pixels 52A present in an arbitrary row and the other pixel group including the phase difference detection pixels 52B arranged on one side of the phase difference detection pixels 52A of the one pixel group at the same distance, in the row direction X.

The imaging element 5 may include a plurality of pairs each including the first signal detection section that receives one of the pair of luminous fluxes passing through the different portions of the pupil region of the imaging lens 1 and detects the signal corresponding to the light reception amount and the second signal detection section that receives the other one of the pair of luminous fluxes and detects the signal corresponding to the light reception amount, and is not limited to the configuration shown in FIGS. 2 to 5.

For example, all the pixels included in the imaging element 5 are the imaging pixels 51. The imaging pixel 51 is divided into two. One divided area may be the phase difference detection pixel 52A, and the other divided area may be the phase difference detection pixel 52B.

Figure 6:
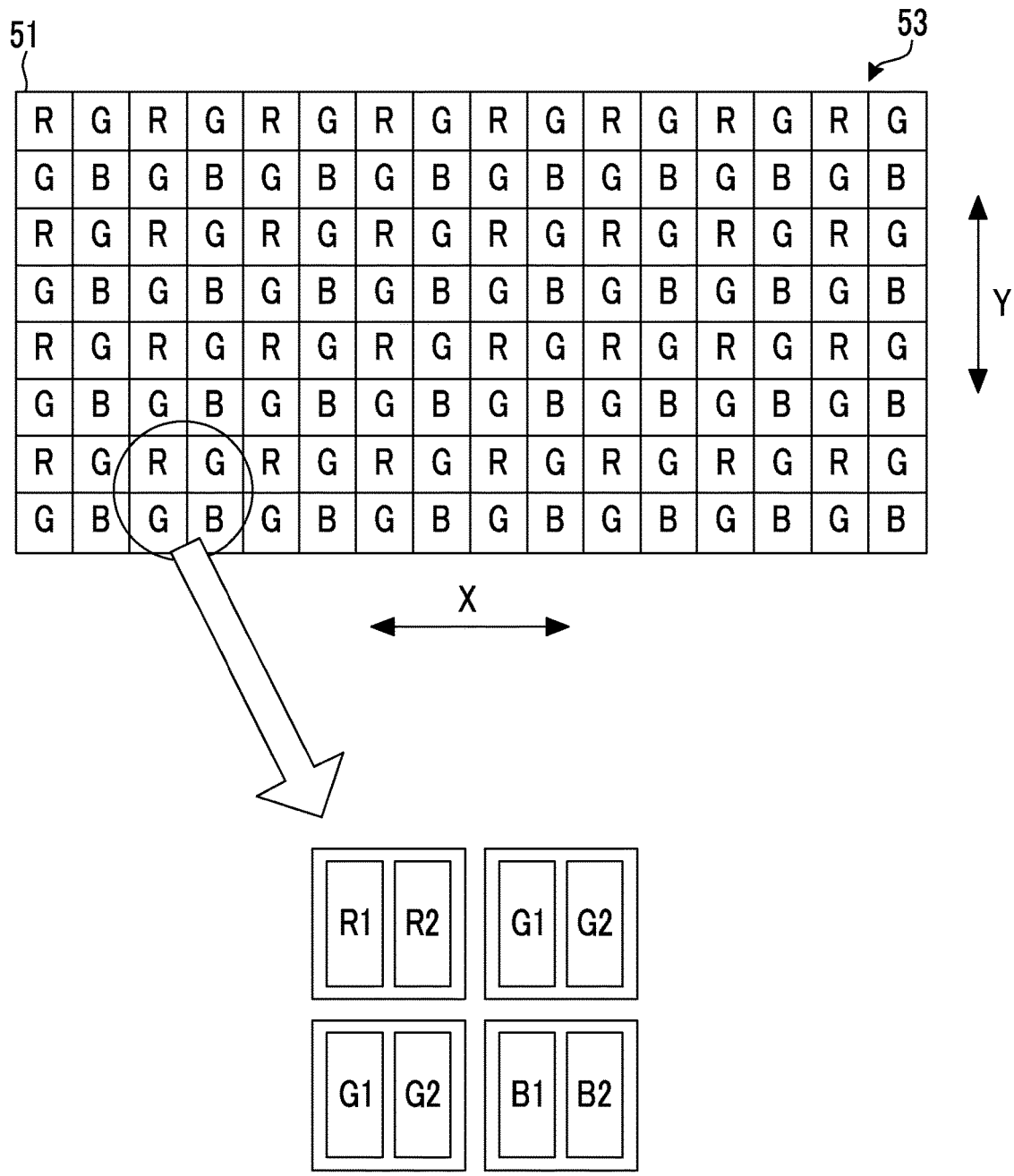
FIG. 6 is a diagram showing a configuration in which all pixels included in an imaging element 5 are imaging pixels 51 and each imaging pixel 51 is divided into two.

FIG. 6 is a diagram showing a configuration in which all the pixels included in the imaging element 5 are the imaging pixels 51 and the imaging pixels 51 are classified into two classification portions.

In the configuration of FIG. 6, the imaging pixel 51 provided with a R filter in the imaging element 5 is divided into two, and two divided portions are a phase difference detection pixel R1 and a phase difference detection pixel R2. The imaging pixel 51 provided with a G filter in the imaging element 5 is divided into two, and two divided portions are a phase difference detection pixel G1 and a phase difference detection pixels G2. The imaging pixel 51 provided with a B filter in the imaging element 5 is divided into two, and two divided portions are a phase difference detection pixel B1 and a phase difference detection pixels B2.

In this configuration, the phase difference detection pixels R1, G1, and B1 are the first signal detection sections, and the phase difference detection pixels R2, G2, and B2 are the second signal detection sections.

The signals may be independently read out of the first signal detection sections and the second signal detection sections. In a case where the signals of the first signal detection sections and the second signal detection sections are added, typical imaging signals having no phase difference amount are acquired. That is, in the configuration of FIG. 6, all the pixels may be used as both of the phase difference detection pixels and the imaging pixels.

Figure 7:
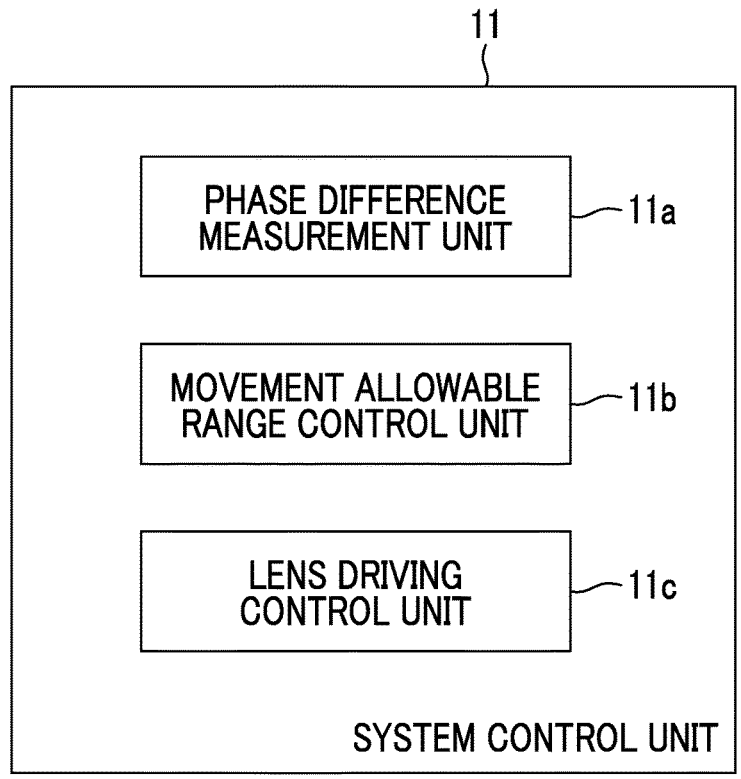
FIG. 7 is a diagram showing a functional block formed by a focusing control program being executed by a system control unit 11 shown in FIG. 1.

FIG. 7 is a diagram showing a functional block formed by the focusing control program being executed by the system control unit 11 shown in FIG. 1. The system control unit 11 functions as a phase difference measurement unit 11a, a movement allowable range control unit 11b, and a lens driving control unit 11c by executing the focusing control program stored in the ROM.

The phase difference measurement unit 11a measures a phase difference amount which is a relative position shift amount between two images formed by the pair of luminous fluxes by using a first signal group output from a plurality of phase difference detection pixels 52A which is present in one focus detection area 53 selected through an user operation among nine focus detection area 53 and a second signal group output from the phase difference detection pixels 52B paired with the phase difference detection pixels 52A.

Specifically, an area S[d] surrounded by two data waveforms acquired by the following Expression (1) in a case where data items of the first signal group output from the plurality of phase difference detection pixels 52A are A[1], . . . , and A[k], data items of the second signal group output from the phase difference detection pixels 52B paired with the phase difference detection pixels 52A are B[1], . . . , and B[k], and the two data items are shifted by "d".

[Expression 1]

$$S[d] = \sum_{n=1}^{k} (A[n+d] - B[n])^2 \quad (1)$$

$$d = -L, \ldots, -2, -1, 0, 1, 2, \ldots, L$$

The phase difference measurement unit 11a measures a value of d at which a value of the area S[d] is minimum, as a phase difference amount between the first signal group and the second signal group.

The movement allowable range control unit 11b controls a movement allowable range in which the movement of the focus lens set in a first range from the MOD end to the INF end is allowed.

The movement allowable range control unit 11b widens the movement allowable range as a difference between a first position of the focus lens before the focus lens moves and a target focusing position of the focus lens based on the phase difference amount measured by the phase difference measurement unit 11a becomes larger.

Figure 8:
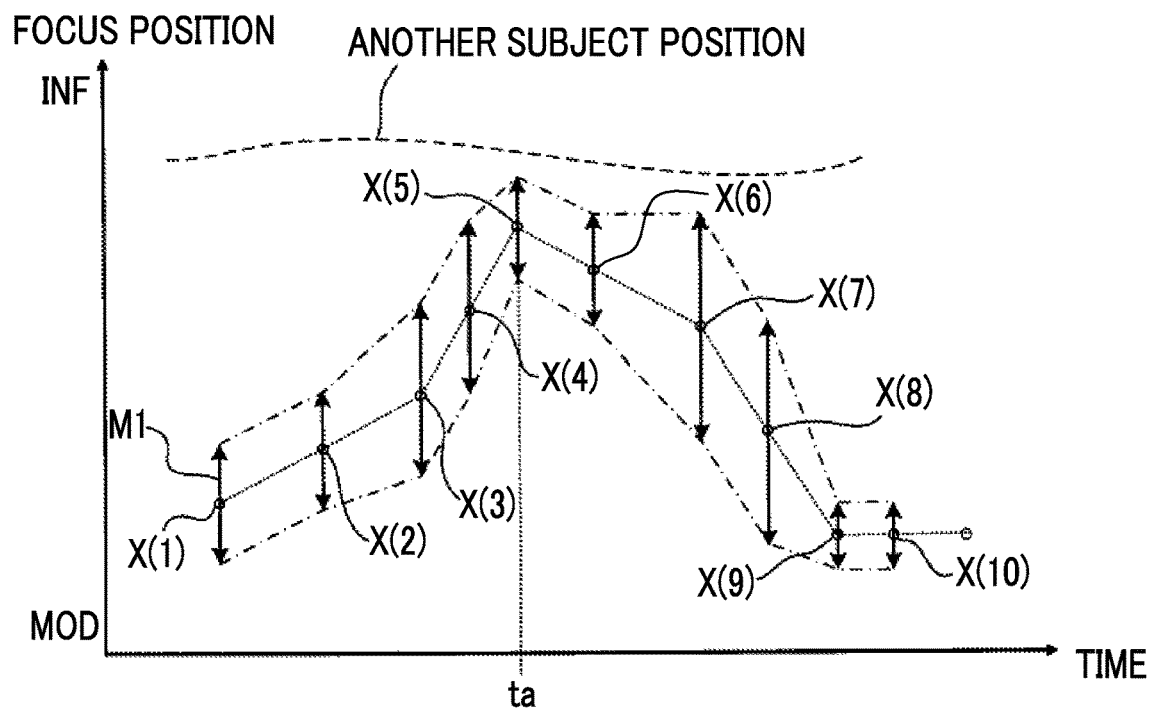
FIG. 8 is a schematic graph for describing a method of controlling a movement allowable range of a focus lens by means of the system control unit 11 shown in FIG. 1.

FIG. 8 is a schematic graph for describing a method of controlling the movement allowable range of the focus lens by means of the system control unit 11 shown in FIG. 1. In FIG. 8, a horizontal axis depicts a time, and a vertical axis depicts a focus position (a position of the focus lens).

In FIG. 8, target focusing positions x(1) to x(10), a trajectory of positions converted into focus lens positions of a subject different from a target subject, and movement allowable ranges (indicated by left-right arrows) set in times when the target focusing positions x(1) to x(10) are determined are illustrated.

The movement allowable range control unit 11b sets a movement allowable range M1 in which the movement of the focus lens is allowed based on the phase difference amount measured by the phase difference measurement unit 11a in a state in which the focus lens moves to the target focusing position x(1).

Specifically, the movement allowable range control unit 11b sets the movement allowable range M1 in which the movement of the focus lens is allowed from a difference between the current position (target focusing position x(1)) of the focus lens before the focus lens moves and the target focusing position x(2) of the focus lens based on the calculated phase difference amount.

The movement allowable range M1 is set with equal width on a side (a side close to the imaging optical system) of the MOD end and a side (a side far away from the imaging optical system) of the INF end with the current focus position as a starting point.

Information indicating the movement allowable range set from the difference between the position of the focus lens before the focus lens moves and the target focusing position of the focus lens based on the phase difference amount is acquired in advance at the time of manufacturing the digital camera, and is stored in the ROM of the system control unit 11.

The movement allowable range control unit 11b sets the movement allowable range based on the difference by reading the information indicating the movement allowable range corresponding to the difference out of the ROM and transmitting the information indicating the readout movement allowable range to the lens drive unit 8.

The movement allowable range is set to a wide range as the difference between the position of the focus lens before the focus lens moves and the target focusing position of the focus lens based on the phase difference amount measured in a state in which the focus lens is present in this position becomes larger.

A case where the difference between the current position of the focus lens and the target focusing position becomes larger means that the target subject to be in focus largely moves in the optical axis direction of the imaging optical system (a movement speed of the target subject in the optical axis direction is fast).

Accordingly, in a case where the target subject moves fast in the optical axis direction, the movement allowable range is set to be wide in order to focus on the target subject. Meanwhile, in a case where the target subject moves slowly in the optical axis direction or the target subject stops, the movement allowable range is set to be narrow in order to prevent another subject other than the target subject from being in focus.

For example, in FIG. 8, the difference between the target focusing position x(4) determined in a state in which the focus lens is present in the target focusing position x(3) and the current position (target focusing position x(3)) of the focus lens is larger than the difference between the target focusing position x(3) determined in a state in which the focus lens is present in the target focusing position x(2) and the target focusing position x(2).

Thus, the movement allowable range set in a time when the target focusing position x(3) is determined is wider than the movement allowable range set in a time when the target focusing position x(2) is determined.

For example, even though another subject position is erroneously detected as the target focusing position in a time to of FIG. 8, since the focus lens is not able to move only within the movement allowable range by setting the movement allowable range in this manner, it is possible to prevent the focusing position from being largely shifted from the target subject. In a case where the target subject approaches another subject at a high speed, it is possible to focus on the target subject by setting the movement allowable range to be wide.

The description will be continued by referring back to FIG. 7. The lens driving control unit 11c sends a command to the lens drive unit 8 through the lens control unit 4, and drives the focus lens within the movement allowable range controlled by the movement allowable range control unit 11b based on the phase difference amount measured by the phase difference measurement unit 11a.

The lens driving control unit 11c moves the focus lens to the target focusing position in a case where the target focusing position based on the phase difference amount measured by the phase difference measurement unit 11a is present in the movement allowable range controlled by the movement allowable range control unit 11b.

The lens driving control unit 11c moves the focus lens to an end of the movement allowable range close to the target focusing position in a case where the target focusing position based on the phase difference amount measured by the phase difference measurement unit 11a is present in the movement allowable range controlled by the movement allowable range control unit 11b.

Figure 9:
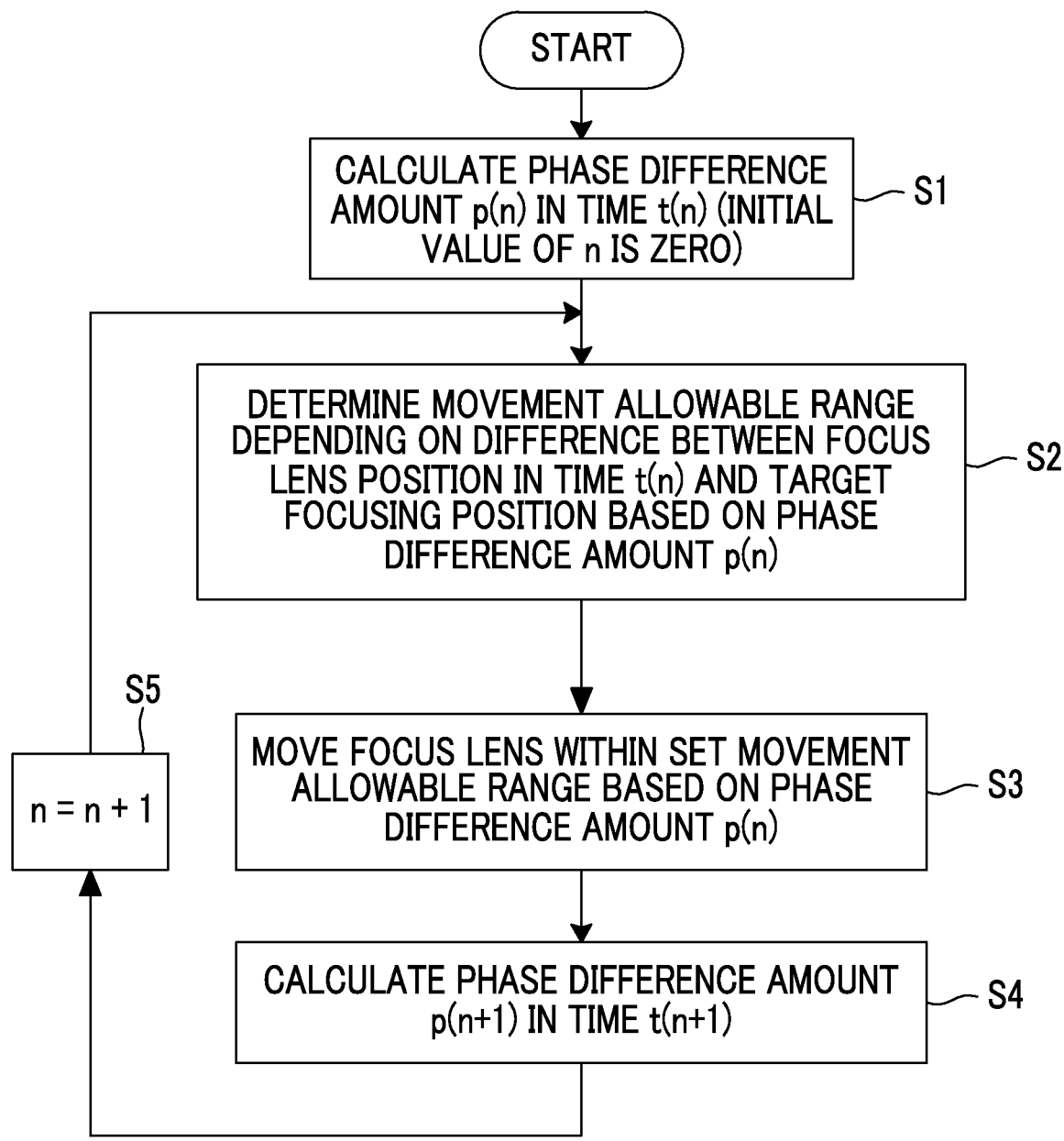
FIG. 9 is a flowchart for describing an operation of the system control unit 11 shown in FIG. 1.

FIG. 9 is a flowchart for describing an operation of the system control unit 11 shown in FIG. 1. For example, the operation of FIG. 9 shows an example in which the focusing control using the phase difference AF method is continuously performed while the moving image is captured.

In a case where the moving image imaging mode is set, the phase difference measurement unit 11a calculates a phase difference amount p(n) in a time t(n) by using the first signal group and the second signal group output from the selected focus detection area 53 of the imaging element 5 in a time t(n) (an initial value of n is zero) (step S1). Step S1 constitutes a phase difference detection step.

In this case, it is assumed that t(n) means that a time order is "n" in a case where calculation is performed, and t(n) represents an n-th time. For example, in a case where a certain time is set as t(0)=0 and a time when a signal on which the calculation of the phase difference amount is subsequently performed is acquired is 0.5 seconds later, t(1)=0.5.

The movement allowable range control unit 11b determines the target focusing position based on the phase difference amount p(n) calculated by the phase difference measurement unit 11a, and calculates the difference between the determined target focusing position and the position of the focus lens in the time t(n). The movement allowable range control unit 11b reads the movement allowable range corresponding to the calculated difference out of the ROM, and sets the readout movement allowable range (step S2). Step S2 constitutes a movement allowable range control step.

Subsequently, the lens driving control unit 11c moves the focus lens within the movement allowable range set in step S2 based on the target focusing position determined by the movement allowable range control unit 11b (step S3). Step S3 constitutes a lens driving control step.

In a time t(n+1), the phase difference measurement unit 11a calculates a phase difference amount p(n+1) in the time t(n+1) by using the first signal group and the second signal group output from the selected focus detection area 53 of the imaging element 5 (step S4). Step S4 constitutes a phase difference detection step.

In a case where the phase difference amount p(n+1) is calculated in step S4, n is updated to (n+1) (step S5), and then S2 and the subsequent processes are performed again.

As stated above, according to the digital camera shown in FIG. 1, it is possible to control the range in which the movement of the focus lens is allowed depending on the difference between the current position of the focus lens and the target focusing position based on the phase difference amount through the operation described in FIG. 9.

Accordingly, it is possible to accurately focus on the target subject moving at a high speed, and it is possible to prevent another subject other than the target subject from being in focus.

It has been described above that the movement allowable range control unit 11b sets the range with equal width on the front and rear sides in the optical axis direction with the current position of the focus lens as the starting point.

As a modification example, the movement allowable range control unit 11b may individually control a width of a front range and a width of a rear range of the current position of the focus lens in the movement allowable range.

Figure 10:
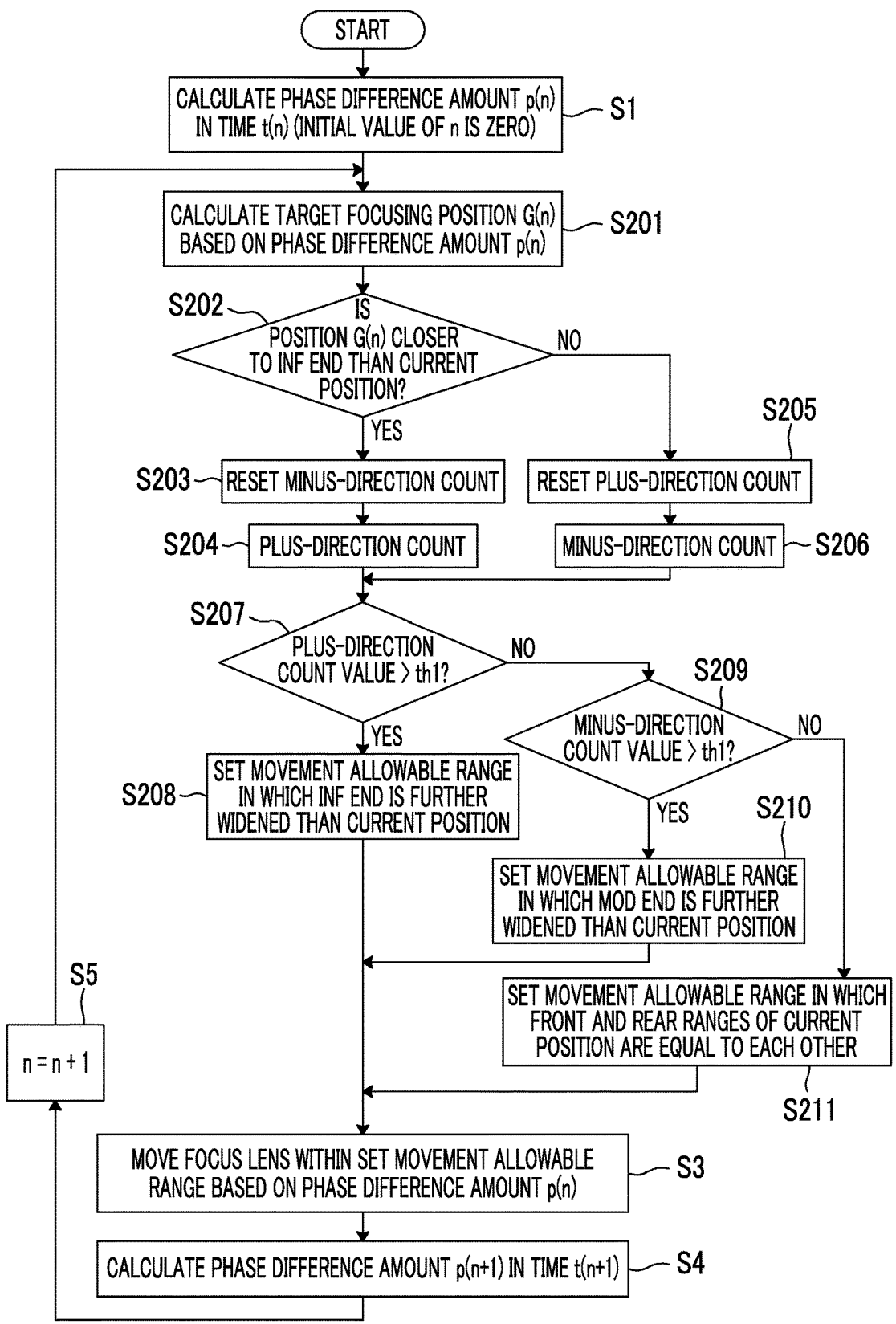
FIG. 10 is a flowchart for describing a modification example of the operation of the system control unit 11 shown in FIG. 1.

FIG. 10 is a flowchart for describing a modification example of the operation of the system control unit 11 shown in FIG. 1. In FIG. 10, the same processes as those shown in FIG. 9 will be assigned the same references, and the description thereof will be omitted.

Hereinafter, a direction from the MOD end to the INF end is defined as a plus direction and a direction from the INF end to the MOD end is defined as a minus direction in the movement range of the focus lens.

The direction from the MOD end to the INF end is one direction of the optical axis direction of the imaging optical system, and the direction from the INF end to the MOD end is the other direction of the optical axis direction of the imaging optical system.

After step S1, the movement allowable range control unit 11b calculates a target focusing position G(n) based on the phase difference amount p(n) calculated in step S1 (step S201).

Subsequently, the movement allowable range control unit 11b determines whether or not the target focusing position G(n) is closer to the plus direction (close to the INF end) than the position of the focus lens in the time t(n) (step S202).

In a case where it is determined that the target focusing position G(n) is closer to the plus direction than the position of the focus lens in the time t(n) (YES: step S202), the movement allowable range control unit 11b resets a minus-direction count value (step S203), and increases a plus-direction count value indicating a state in which the target focusing position is closer to the plus direction than the position of the focus lens in the time t(n) by one (step S204).

In a case where it is determined that the target focusing position G(n) is closer to the minus direction than the position of the focus lens in the time t(n) (step S202: NO), the movement allowable range control unit 11b resets the plus-direction count value (step S205), and increases the minus-direction count value indicating a state in which the target focusing position is closer to the minus direction than the position of the focus lens in the time t(n) by one (step S206).

After step S204 or step S206, the movement allowable range control unit 11b determines whether or not the plus-direction count value exceeds a threshold value th1 (step S207). The threshold value th1 is set to an arbitrary value of a natural number of 2 or greater.

In a case where the determination result of step S207 is YES, the movement allowable range control unit 11b calculates the difference between the target focusing position G(n) and the position of the focus lens in the time t(n), and reads the movement allowable range corresponding to the calculated difference out of the ROM.

The movement allowable range control unit 11b changes a ratio between the range closer to the plus direction than the position of the focus lens in the time t(n) and the range closer to the minus direction than the position of the focus lens in the time t(n) in the readout movement allowable range to a ratio of 1:1 to a ratio at which the range closer to the plus direction is relatively large, and sets the changed movement allowable range (step S208).

In a case where the determination result of step S207 is NO, the movement allowable range control unit 11b determines whether or not the minus-direction count value exceeds the threshold value th1 (step S209).

In a case where the determination result of step S209 YES, the movement allowable range control unit calculates the difference between the target focusing position G(n) and the position of the focus lens in the time t(n), and reads the movement allowable range corresponding to the calculated difference out of the ROM.

The movement allowable range control unit 11b changes the ratio between the range closer to the plus direction than the position of the focus lens in the time t(n) and the range closer to the minus direction than the position of the focus lens in the time t(n) in the readout movement allowable range from a ratio of 1:1 to a ratio at which the range closer to the minus direction is relatively large, and sets the changed movement allowable range (step S210).

In a case where the determination result of step S209 is NO, the movement allowable range control unit 11b calculates the difference between the target focusing position G(n) and the position of the focus lens in the time t(n), reads the movement allowable range corresponding to the calculated difference out of the ROM, and sets the readout movement allowable range (step S211).

The processes of steps S3 to step S5 are performed after step S208, step S210, or step S211, and the process returns to step S201 after step S5. Step S201 to step S211 constitute the movement allowable range control step.

Figure 11:
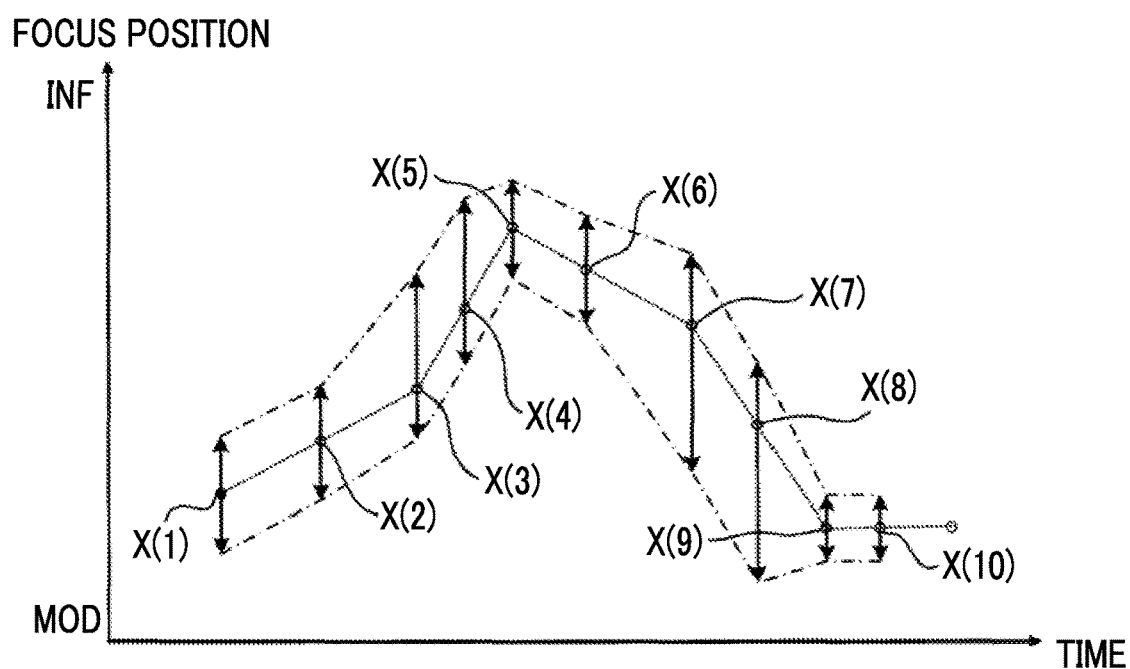
FIG. 11 is a schematic graph for describing a method of controlling the movement allowable range of the focus lens represented in the flowchart shown in FIG. 10.

FIG. 11 is a schematic graph for describing a method of controlling the movement allowable range of the focus lens represented in the flowchart shown in FIG. 10. In FIG. 11, a horizontal axis depicts a time, and a vertical axis depicts a focus position.

FIG. 11 shows the target focusing positions x(1) to x(10) and the movement allowable ranges (indicated by left-right arrows) set in the times when the target focusing positions x(1) to x(10) are determined.

In the example shown in FIG. 11, in a case where the target focusing position x(4) is determined in a state in which the focus lens is present in the target focusing position x(3), the plus-direction count value is "3".

In the example of FIG. 11, the threshold value th is set to "2", and the movement allowable range is set such that the range closer to the plus direction is wider than the range closer to the minus direction in a point of time when the target focusing position x(4) is determined.

In a case where the target focusing position x(8) is determined in a state in which the focus lens is present in the target focusing position x(7), the minus-direction count value is "3". Thus, the movement allowable range is set such that the range closer to the minus direction is wider than the range closer to the plus direction in a point of time when the target focusing position x(8) is determined.

In a case where the target focusing position x(6) is determined in a state in which the focus lens is present in the target focusing position x(5), the plus-direction count value is reset, and the minus-direction count value is "1". Thus, the movement allowable range is set such that the range closer to the minus direction and the range closer to the plus direction are the same ratio in a point of time when the target focusing position x(5) is determined.

As described above, the sizes of the movement allowable ranges set in the respective times are determined by the difference between the current position of the focus lens and the target focusing position.

As stated above, in a case where it is determined that the target subject moves in a predetermined direction, it is possible to improve trackability for the moving target subject by setting the movement allowable range in which the range closer to the movement direction is widened, and it is possible to improve focusing accuracy.

Figure 12:
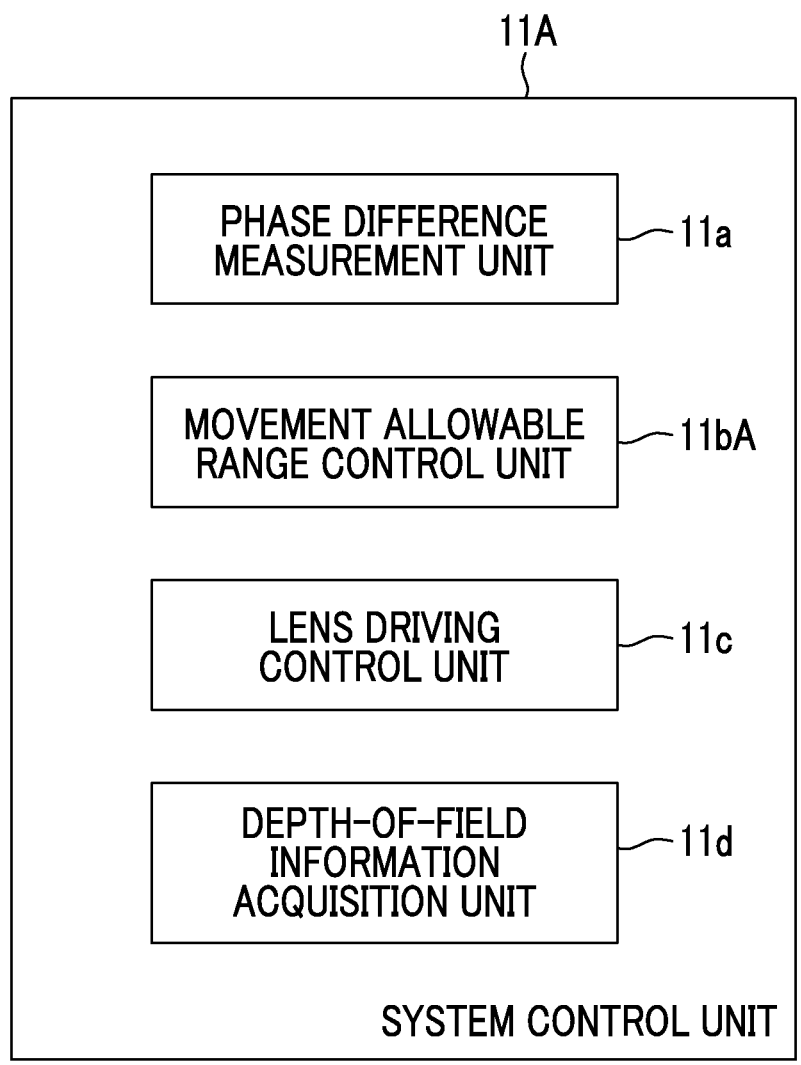
FIG. 12 is a diagram showing a functional block of a system control unit 11A which is a modification example of the system control unit 11 shown in FIG. 1.

FIG. 12 is a functional block diagram of a system control unit 11A which is a modification example of the system control unit 11 shown in FIG. 1.

The system control unit 11A shown in FIG. 12 has the same configuration as that of FIG. 7 except that the movement allowable range control unit 11b is changed to a movement allowable range control unit 11bA and a depth-of-field information acquisition unit 11d is added.

The movement allowable range control unit 11bA and the depth-of-field information acquisition unit 11d are functional blocks formed by the focusing control program which is stored in the ROM and is executed by the processor.

The depth-of-field information acquisition unit 11d of the system control unit 11A shown in FIG. 12 calculates a subject distance which is a distance to the target subject from the light reception surface of the imaging element 5 based on the phase difference amount measured by the phase difference measurement unit 11a.

The subject distance is one of parameters for determining the depth of field. The closer the subject distance, the shallower the depth of field. The farther the subject distance, the deeper the depth of field.

As stated above, since the subject distance is information correlated with the depth of field, the subject distance may be information of the depth of field. The depth-of-field information acquisition unit 11d acquires the information of the depth of field of the imaging optical system by calculating the subject distance.

The movement allowable range control unit 11bA of the system control unit 11A widens the movement allowable range as the subject distance acquired by the depth-of-field information acquisition unit 11d becomes shorter, that is, the depth of field based on the subject distance becomes shallower.

Data acquired by associating the subject distance with the movement allowable range is acquired in advance at the time of manufacturing the digital camera, and is stored in the ROM of the system control unit 11.

The movement allowable range control unit 11bA of the system control unit 11A reads the information indicating the movement allowable range corresponding to the subject distance acquired by the depth-of-field information acquisition unit 11d out of the ROM, and sets the readout movement allowable range.

Figure 13:
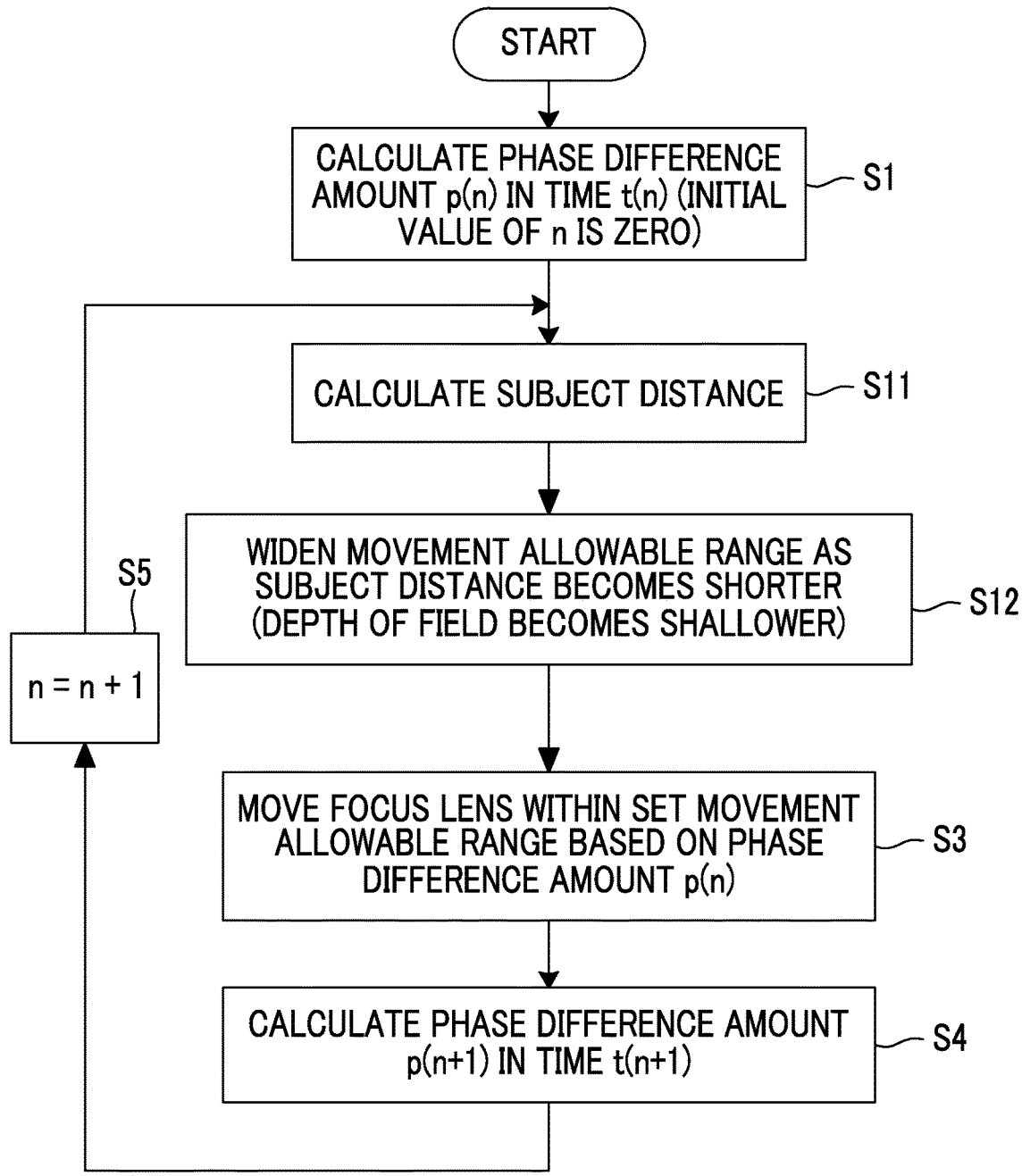
FIG. 13 is a flowchart for describing an operation of the system control unit 11A shown in FIG. 12.

FIG. 13 is a flowchart for describing an operation of the system control unit 11A shown in FIG. 12. In FIG. 13, the same processes as those of FIG. 9 will be assigned the same references, and the description thereof will be omitted.

After step S1, the depth-of-field information acquisition unit 11d of the system control unit 11A calculates the subject distance based on the phase difference amount p(n) calculated in step S1 (step S11). Step S11 constitutes a depth-of-field information acquisition step.

Subsequently, the movement allowable range control unit 11bA reads the movement allowable range corresponding to the subject distance acquired by the depth-of-field information acquisition unit 11d out of the ROM, and sets the readout movement allowable range (step S12). Step S11 constitutes the movement allowable range control step.

The processes of step S3 to step S5 are performed after step S12, and step S11 and the subsequent processes are performed again after step S5.

As stated above, the system control unit 11A controls the movement allowable range depending on the subject distance. According to this configuration, in a state in which the subject distance is short and the depth of field is shallow, the movement allowable range is widened, and thus, it is possible to improve the trackability for the target subject. Thus, it is possible to focus on the target subject with high accuracy.

According to this configuration, in a state in which the subject distance is short and the depth of field is deep, the movement allowable range is narrowed, and the trackability for the target subject deteriorates. Meanwhile, since the depth of field is deep, it is possible to the captured image on which the target subject is approximately in focus.

As mentioned above, according to the system control unit 11A, it is possible to accurately focus on the target subject of which the distance from the digital camera is changed, and it is possible to prevent another subject other than the target subject from being in focus.

The depth-of-field information acquisition unit 11d of the system control unit 11A may acquire information of an F number (aperture value) of the stop 2 included in the imaging optical system, as the information of the depth of field, instead of the subject distance.

The F number is one of the parameters for determining the depth of field. The smaller the F number, the shallower the depth of field. The larger the F number, the deeper the depth of field. As stated above, since the F number is information correlated with the depth of field, the F number may be treated as the information of the depth of field.

Figure 14:
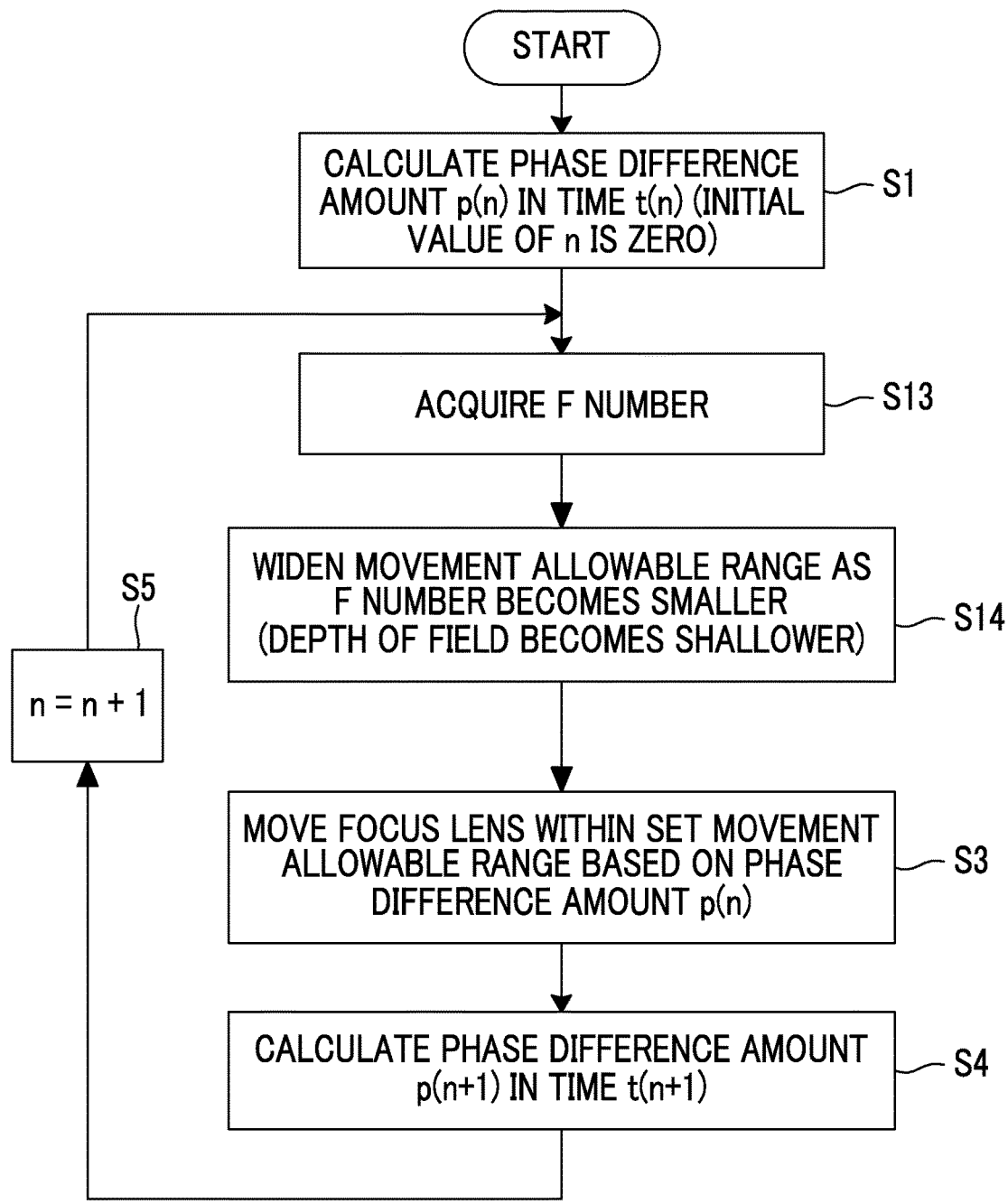
FIG. 14 is a flowchart for describing a first modification example of the operation of the system control unit 11A shown in FIG. 12.

FIG. 14 is a flowchart for describing a first modification example of the operation of the system control unit 11A shown in FIG. 12. In FIG. 14, the same processes as those of FIG. 9 will be assigned the same references, and the description thereof will be omitted.

After step S1, the depth-of-field information acquisition unit 11d of the system control unit 11A acquires information of the F number from the lens control unit 4 of the lens device 40 (step S13). Step S13 constitutes the depth-of-field information acquisition step.

Subsequently, the movement allowable range control unit 11bA reads the movement allowable range corresponding to the F number acquired by the depth-of-field information acquisition unit 11d out of the ROM, and sets the readout movement allowable range (step S14). Step S14 constitutes the movement allowable range control step.

The processes of step S3 to step S5 are performed after step S14, and step S13 and the subsequent processes are performed again after step S5.

As stated above, in the first modification example, the movement allowable range is controlled depending on the F number. According this configuration, in a state in which the F number is small and the depth of field is shallow, the movement allowable range is widened, and thus, it is possible to improve the trackability for the target subject. Thus, it is possible to focus on the target subject with high accuracy.

According to this configuration, in a state in which the F number is small and the depth of field is deep, the movement allowable range is narrowed, and the trackability for the target subject deteriorates. Meanwhile, since the depth of field is deep, it is possible to acquire the captured image on which the target subject is approximately in focus.

As mentioned above, according to the first modification example, it is possible to accurately focus on the target subject of which the distance from the digital camera is changed, and it is possible to prevent another subject other than the target subject from being in focus.

The depth-of-field information acquisition unit 11d of the system control unit 11A may acquire the information of the focal length of the imaging optical system determined in the position of the zoom lens included in the imaging optical system, as the information of the depth of field, instead of the subject distance or the F number.

The focal length is one of the parameters for determining the depth of field. In a case where the focal length is short, the depth of field is shallow, and in a case where the focal length is long, the depth of field is deep. As stated above, since the focal length is information correlated with the depth of field, the focal length may be treated as the information of the depth of field.

Figure 15:
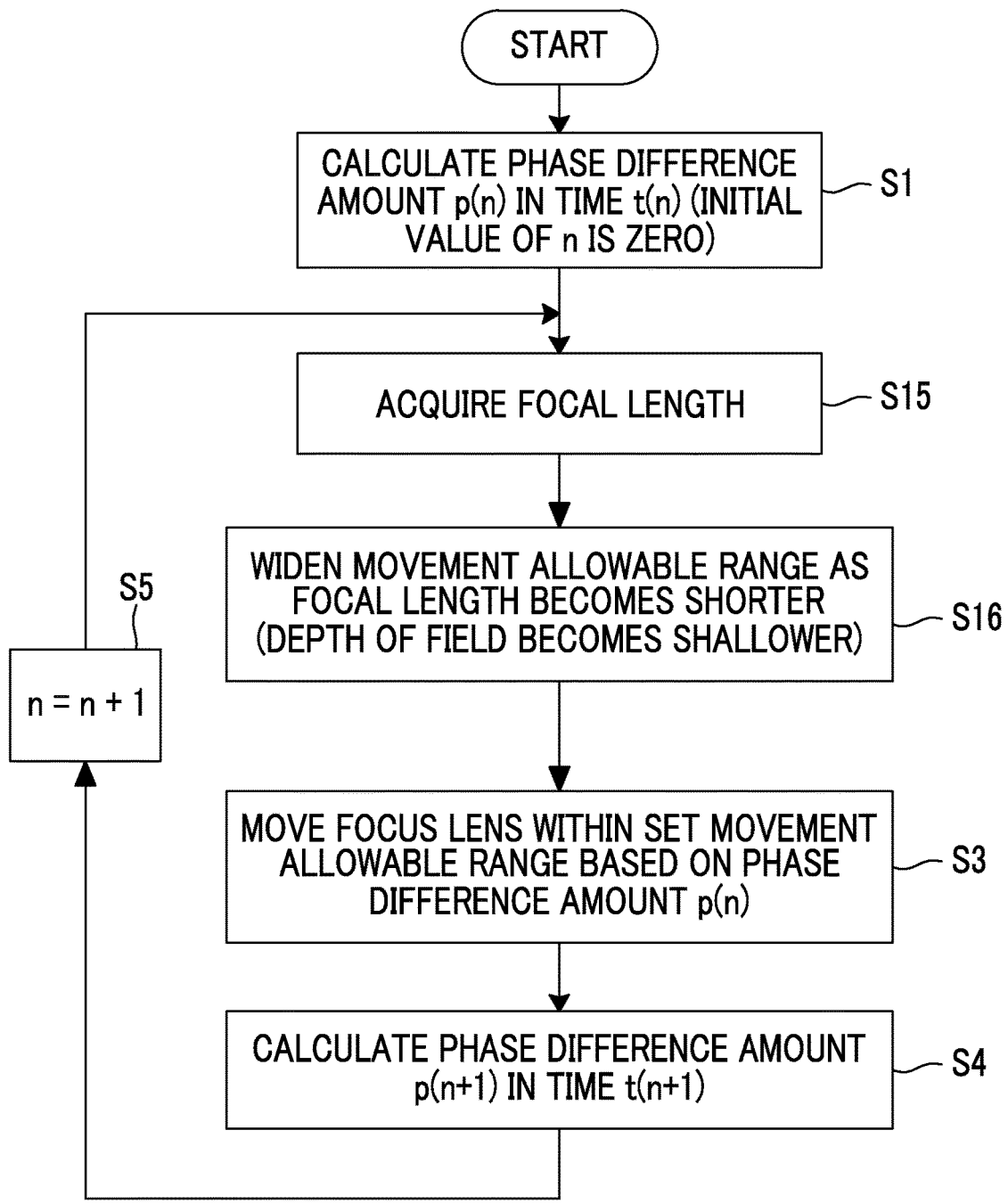
FIG. 15 is a flowchart for describing a second modification example of the operation of the system control unit 11A shown in FIG. 12.

FIG. 15 is a flowchart for describing a second modification example of the operation of the system control unit 11A shown in FIG. 12. In FIG. 15, the same processes as those of FIG. 9 will be assigned the same references, and the description thereof will be omitted.

After step S1, the depth-of-field information acquisition unit 11d of the system control unit 11A acquires the information of the focal length of the imaging optical system from the lens control unit 4 of the lens device 40 (step S15). Step S15 constitutes the depth-of-field information acquisition step.

Subsequently, the movement allowable range control unit 11bA reads the movement allowable range corresponding to the focal length acquired by the depth-of-field information acquisition unit 11d out of the ROM, and sets the readout movement allowable range (step S16). Step S16 constitutes the movement allowable range control step.

The processes of step S3 to step S5 are performed after step S16, and step S15 and the subsequent processes are performed again after step S5.

As stated above, in the second modification example, the movement allowable range is controlled depending on the focal length. According this configuration, in a state in which the focal length is short and the depth of field is shallow, the movement allowable range is widened, and thus, it is possible to improve the trackability for the target subject. Thus, it is possible to focus on the target subject with high accuracy.

According to this configuration, in a state in which the focal length is long and the depth of field is deep, the movement allowable range is narrowed, and the trackability for the target subject deteriorates. Meanwhile, since the depth of field is deep, it is possible to acquire the captured image on which the target subject is approximately in focus.

As mentioned above, according to the first modification example, it is possible to accurately focus on the target subject approaching the digital camera, and it is possible to prevent another subject other than the target subject from being in focus.

The depth-of-field information acquisition unit 11d of the system control unit 11A may acquire two or more items of the subject distance, the F number, and the focal length, as the information of the depth of field.

In this case, the movement allowable range control unit 11bA of the system control unit 11A calculates the depth of field based on all the acquired information items. Data acquired by associating the depth of field with the movement allowable range is stored in the ROM of the system control unit 11A. The movement allowable range control unit 11bA of the system control unit 11A may read out the movement allowable range corresponding to the calculated depth of field, and set the readout the movement allowable range.

Figure 16:
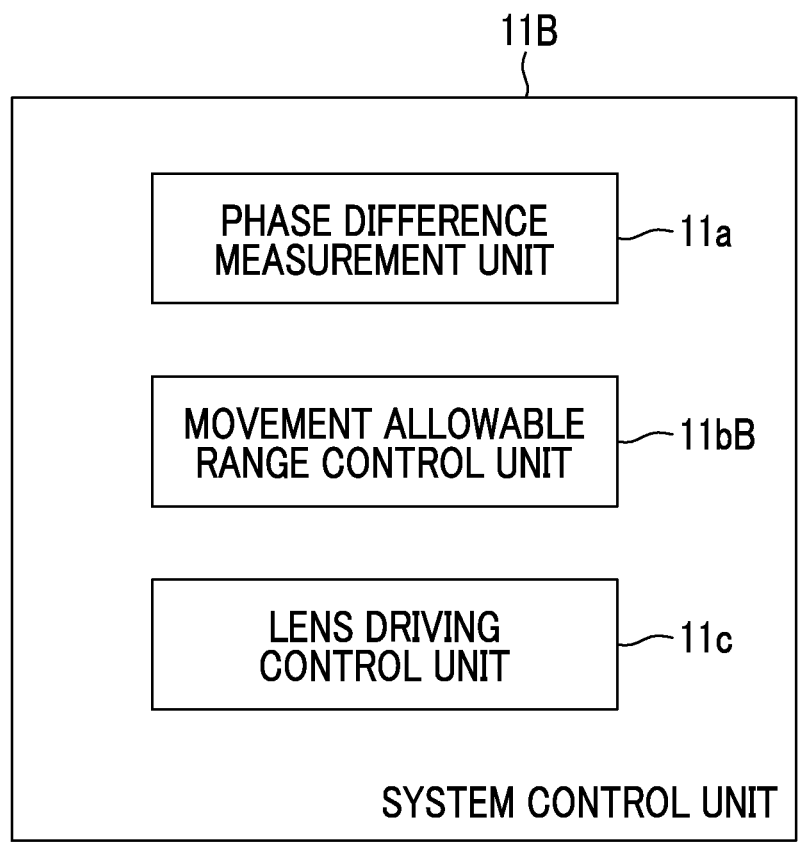
FIG. 16 is a functional block diagram of a system control unit 11B which is a modification example of the system control unit 11 shown in FIG. 1.

FIG. 16 is a diagram showing a functional block of a system control unit 11B which is a modification example of the system control unit 11 shown in FIG. 1.

The system control unit 11B shown in FIG. 12 has the same configuration as that of FIG. 7 except that the movement allowable range control unit 11b is changed to a movement allowable range control unit 11bB. The movement allowable range control unit 11bB is a functional block formed by the focusing control program which is stored in the ROM and is executed by the processor.

The movement allowable range control unit 11bB of the system control unit 11B recognizes the subject captured by the focus detection area 53 from the captured image data captured by the imaging element 5.

Specifically, the movement allowable range control unit 11bB stores an image of a subject which is initially in focus after the digital camera is activated in the ROM, as an image of the target subject, and repeatedly performs a process of recognizing the target subject from the subject captured by the focus detection area 53. The movement allowable range control unit 11bB also performs a process of recognizing a moving object other than the target subject from the subject captured by the focus detection area 53.

The movement allowable range control unit 11bB of the system control unit 11B controls the movement allowable range of the focus lens based on the subject recognition result. The movement allowable range control unit 11bB further narrows the movement allowable range in a case where a subject (moving object) other than the target subject is recognized compared to a case where only the target subject is recognized.

The information items indicating the movement allowable range in a case where the subject other than the target subject is recognized and the movement allowable range in a case where only the target subject is recognized are acquired in advance at the time of manufacturing the digital camera, and are stored in the ROM of the system control unit 11B.

The movement allowable range control unit 11bB of the system control unit 11B reads the information indicating the movement allowable range corresponding to the subject recognition result out of the ROM, and sets the readout movement allowable range.

Figure 17:
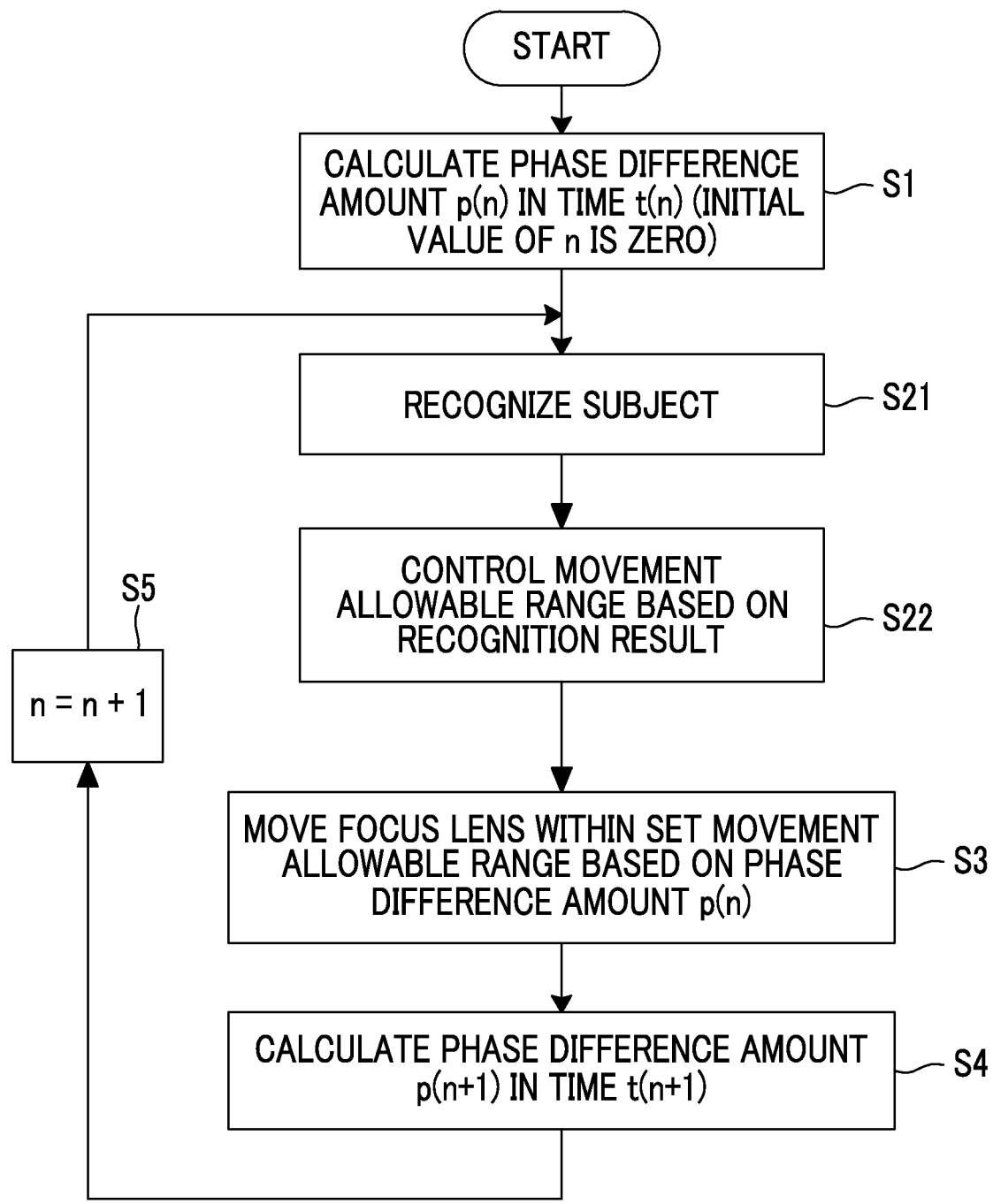
FIG. 17 is a flowchart for describing an operation of the system control unit 11B shown in FIG. 16.

FIG. 17 is a flowchart for describing an operation of the system control unit 11B shown in FIG. 16. In FIG. 17, the same processes as those of FIG. 9 will be assigned the same references, and the description thereof will be omitted.

After step S1, the movement allowable range control unit 11bB acquires the captured image data from the imaging element 5, and recognizes the subject captured by the focus detection area 53 (step S21).

Subsequently, the movement allowable range control unit 11bB reads the movement allowable range corresponding to the subject recognition result out of the ROM, and sets the readout movement allowable range (step S22). Step S21 and step S22 constitute the movement allowable range control step.

The processes of step S3 to step S5 are performed after step S22, and step S21 and the subsequent processes are performed again after step S5.

As stated above, according to the system control unit 11B, the movement allowable range is controlled to be further narrowed in a case where the subject other than the target subject is recognized compared to a case where only the target subject is recognized. Thus, it is possible to prevent another subject other than the target subject from being in focus by narrowing a range in which the focus lens is able to move. As a result, it is possible to focus on the target subject with high accuracy.

For example, in a state in which a person is captured as the target subject, in a case where an unintended object appears like a case where a vehicle crosses in front of behind the person, the movement allowable range is narrowed.

The unintended object is present on the rear or front side of the target subject in many cases. In such a case, since the movement allowable range is narrowed, there is a low possibility that this object will be in focus. Meanwhile, since the movement allowable range is widened in a state in which only the target subject is recognized, it is possible to focus on the target subject in accordance with the movement of the target subject.

As mentioned above, it is possible to accurately focus on the target subject and it is possible to prevent another subject other than the target subject from being in focus by controlling the movement allowable range based on the subject captured by the focus detection area 53.

Figure 18:
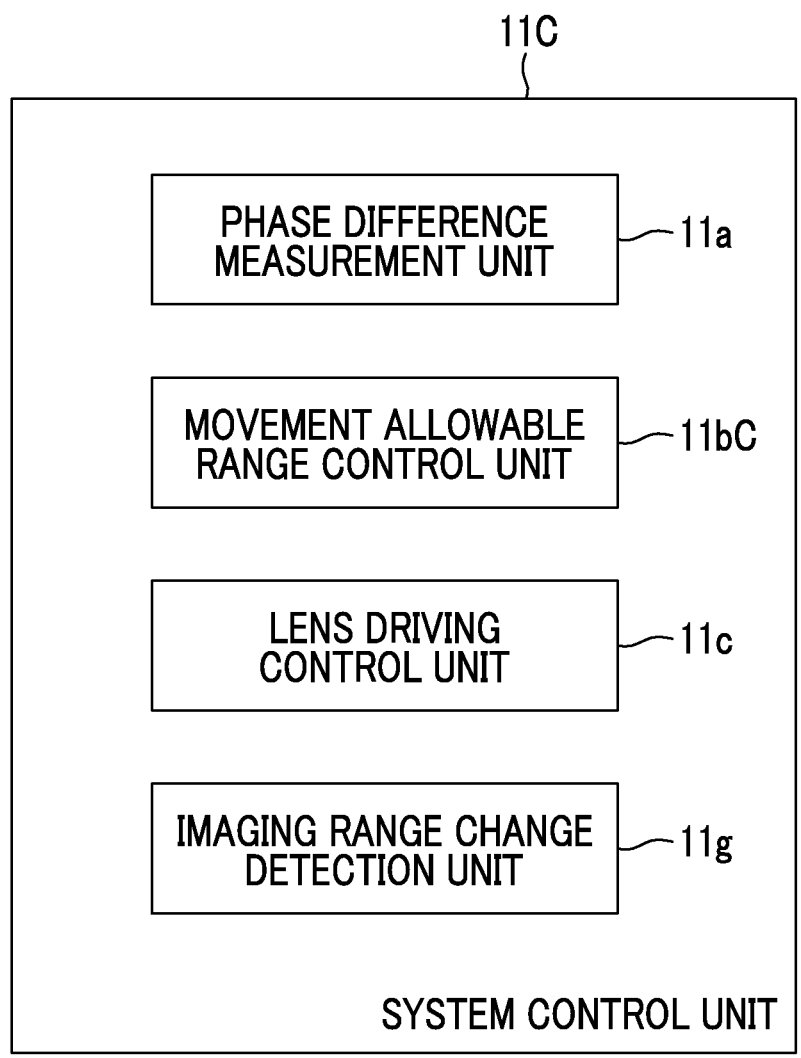
FIG. 18 is a functional block diagram of a system control unit 11C which is a modification example of the system control unit 11 shown in FIG. 1.

FIG. 18 is a diagram showing a functional block of a system control unit 11C which is a modification example of the system control unit 11 shown in FIG. 1.

The system control unit 11C shown in FIG. 18 has the same configuration as that of FIG. 7 except that the movement allowable range control unit 11b is changed to a movement allowable range control unit 11bC and an imaging range change detection unit 11g is added.

The movement allowable range control unit 11bC and the imaging range change detection unit 11g are functional blocks formed by the focusing control program which is stored in the ROM and is executed by the processor.

The imaging range change detection unit 11g of the system control unit 11C detects a change (a change amount of the imaging range or a change rate of the imaging range) of an imaging range by comparing two captured image data items which are captured by the imaging element 5 and are arranged in time order.

The imaging range refers to a range of a space captured by the imaging element 5 through the lens device 40. The change amount of the imaging range and the change rate of the imaging range are information indicating a state of the change of the imaging range.

The imaging range change detection unit 11g may not detect the change of the imaging range through the image processing. Instead, an acceleration sensor may be provided in the digital camera, and the change of the imaging range may be detected based on acceleration information from the acceleration sensor.

The movement allowable range control unit 11bB controls the movement allowable range based on the information indicating the change of the imaging range detected by the imaging range change detection unit 11*g*.

Specifically, the movement allowable range control unit 11*b*B sets a first movement allowable range in a case where the change amount of the imaging range is equal to or greater than a predetermined range threshold value, and sets a second movement allowable range in a case where the change amount of the imaging range is less than the range threshold value. The first movement allowable range is a range wider than the second movement allowable range.

Figure 19:
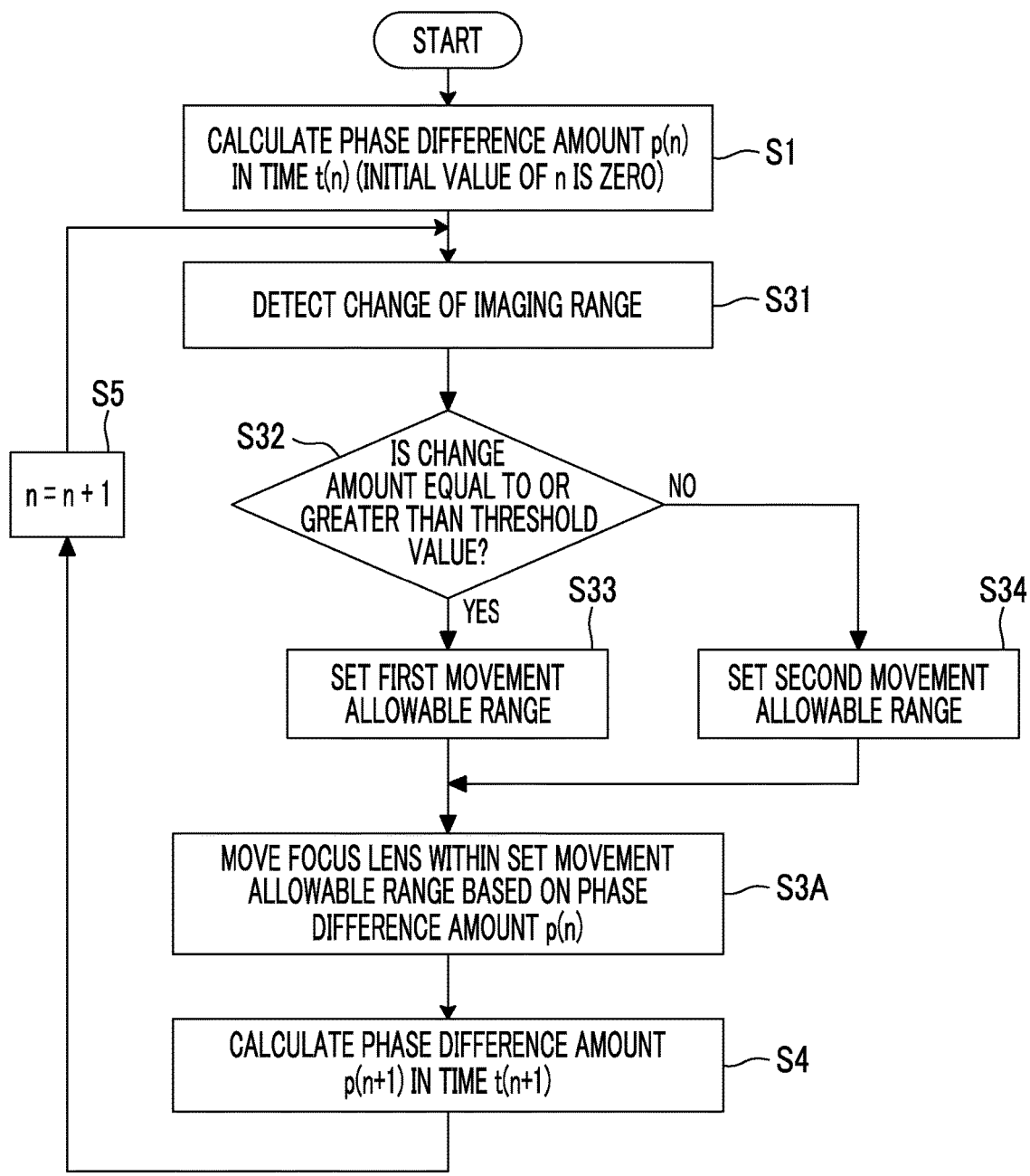
FIG. 19 is a flowchart for describing an operation of the system control unit 11C shown in FIG. 18.

FIG. 19 is a flowchart for describing an operation of the system control unit 11C shown in FIG. 18. In FIG. 19, the same processes as those of FIG. 9 will be assigned the same references, and the description thereof will be omitted.

After step S1, the imaging range change detection unit 11*g* detects the change amount of the imaging range (step S31). Step S31 constitutes an imaging range change detection step.

Subsequently, the movement allowable range control unit 11*b*C determines whether or not the change amount of the imaging range detected by the imaging range change detection unit 11*g* is equal to or greater than the range threshold value (step S32), and controls the movement allowable range so as to be the first movement allowable range (step S33) in a case where it is determined that the change amount of the imaging range is equal to or greater than the threshold value (step S32: YES).

Meanwhile, in a case where it is determined that the change amount of the imaging range is less than the range threshold value (step S32: NO), the movement allowable range control unit 11*b*C controls the movement allowable range so as to be the second movement allowable range (step S34).

Step S32, step S33, and step S34 constitute the movement allowable range control step.

The processes of step S3 to step S5 are performed after step S34, and step S31 and the subsequent processes are performed again after step S5.

As stated above, the system control unit 11C widens the movement allowable range in a case where the change amount of the imaging range is equal to or greater than the range threshold value. In a case where the imaging range is largely changed, there is a high possibility that the position of the target subject will be largely changed. Thus, the movement allowable range is widened in this case, and thus, it is possible to improve the focusing accuracy by increasing the trackability for the target subject.

The first movement allowable range may be set to be the same as the first range which is a movable range of the focus lens.

By doing this, in a case where the imaging range is largely changed, since the focus lens is able to move to the maximum extent, it is possible to improve the trackability for the target subject.

Although it has been described in FIG. 19 that the width of the movement allowable range is changed in two steps depending on the change amount of the imaging range, the movement allowable range may be changed in three steps or more.

After the movement allowable range is controlled so as to be wide in step S33 of FIG. 19, the movement allowable range may be returned to the second movement allowable range after a predetermined time elapses.

Since the large change of the imaging range does not frequently occur, the movement allowable range is returned to the original movement allowable range after a predetermined time elapses after the large change occurs, and thus, it is possible to decrease a possibility that the subject other than the target subject will be in focus.

Figure 20:
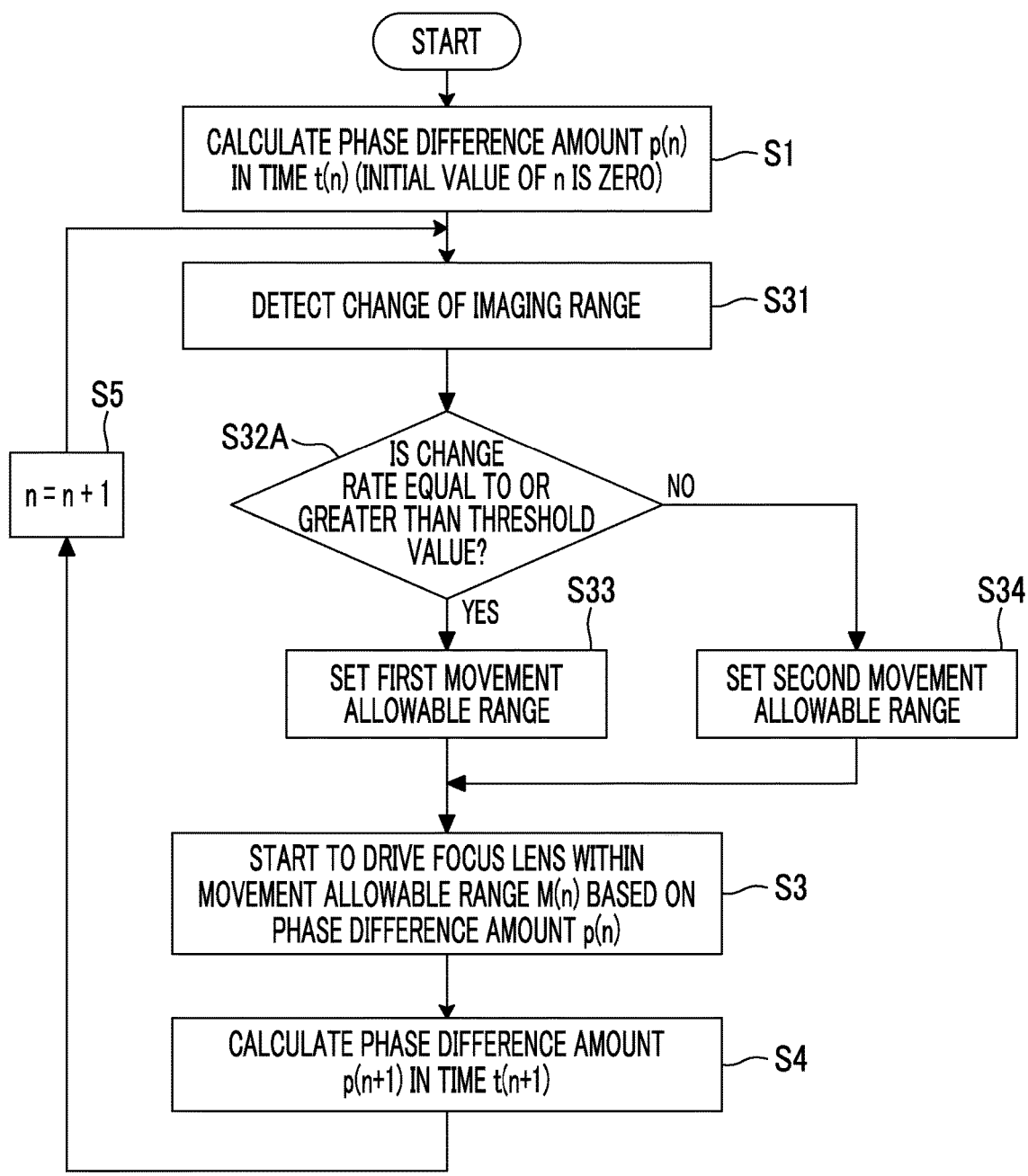
FIG. 20 is a flowchart for describing a modification example of the operation of the system control unit 11C.

FIG. 20 is a flowchart for describing a modification example of the operation of the system control unit 11C. In FIG. 20, the same processes as those of FIG. 19 will be assigned the same references, and the description thereof will be omitted.

In the modification example, the imaging range change detection unit 11*g* detects the change rate of the imaging range. The change rate of the imaging range is the information indicating the state of the change of the imaging range.

After step S31, the movement allowable range control unit 11*b*C determines whether or not the change rate of the imaging range detected by the imaging range change detection unit 11*g* is equal to or greater than a predetermined rate threshold value (step S32A), and performs the process of step S33 in a case where it is determined that the change rate of the imaging range is equal to or greater than the rate threshold value (step S32A: YES).

Meanwhile, in a case where it is determined that the change rate of the imaging range is less than the rate threshold value (step S32A: NO), the movement allowable range control unit 11*b*C performs the process of step S34.

Step S32A, step S33, and step S34 constitute the movement allowable range control step.

As stated above, the system control unit 11C according to the modification example widens the movement allowable range in a case where the change rate of the imaging range is equal to or greater than the rate threshold value. In a case where the imaging range is changed fast, there is a high possibility that the position of the target subject will be largely changed.

Thus, the movement allowable range is widened in this case, and thus, it is possible to improve the focusing accuracy by increasing the trackability for the target subject.

The first movement allowable range according to the modification example may be set to be the same as the first range which is the movable range of the focus lens.

By doing this, in a case where the imaging range is changed fast, since the focus lens is able to move to the maximum extent, it is possible to improve the trackability for the target subject.

Although it has been described in FIG. 20 that the width of the movement allowable range is changed in two steps depending on the change rate of the imaging range, the movement allowable range may be changed in three steps or more.

After the movement allowable range is controlled so as to be wide in step S33 of FIG. 20, the movement allowable range may be returned to the second movement allowable range after a predetermined time elapses. Since the fast change of the imaging range does not frequently occur, the movement allowable range is returned to the original movement allowable range after a predetermined time elapses after such a change occurs, and thus, it is possible to decrease a possibility that the subject other than the target subject will be in focus.

The operations described in FIGS. 12 to 20 may also be applied to a case where the contrast AF method is used as the AF method. In this case, a functional block for calculating a contrast evaluation value may be provided instead of the phase difference measurement unit 11*a*, and a lens driving control unit 11*c* may move the focus lens based on the contrast evaluation value.

It has been described above that the lens driving control unit 11*c* drives the focus lens within the controlled movement allowable range. The movement allowable range corresponds to a numerical range of a defocus amount. The defocus amount is determined based on the phase difference amount. Accordingly, the movement allowable range may be prescribed as the range of the phase difference amount.

That is, based on the phase difference amount measured by the phase difference measurement unit 11a and the movement allowable range (the range of the phase difference amount) controlled by the movement allowable range control unit 11b, 11bA, 11bB, or 11bC, the lens driving control unit 11c may move the focus lens according to the defocus amount based on the phase difference amount in a case where the phase difference amount is within the movement allowable range, and may move the focus lens according to the defocus amount based on an upper limit or a lower limit of the movement allowable range in a case where the phase difference amount is out of the movement allowable range.

As stated above, the range in which the movement of the focus lens is allowed is controlled by the phase difference amount, and thus, it is possible to increase a reaction speed until the focus lens is driven. As a result, it is possible to perform the AF operation at a high speed.

In the aforementioned digital camera, the system control unit 11, the system control unit 11A, the system control unit 11B, or the system control unit 11C functions as a focusing control device. Although the digital camera is used as an example, the invention may be applied to a camera system for broadcasting.

Figure 21:
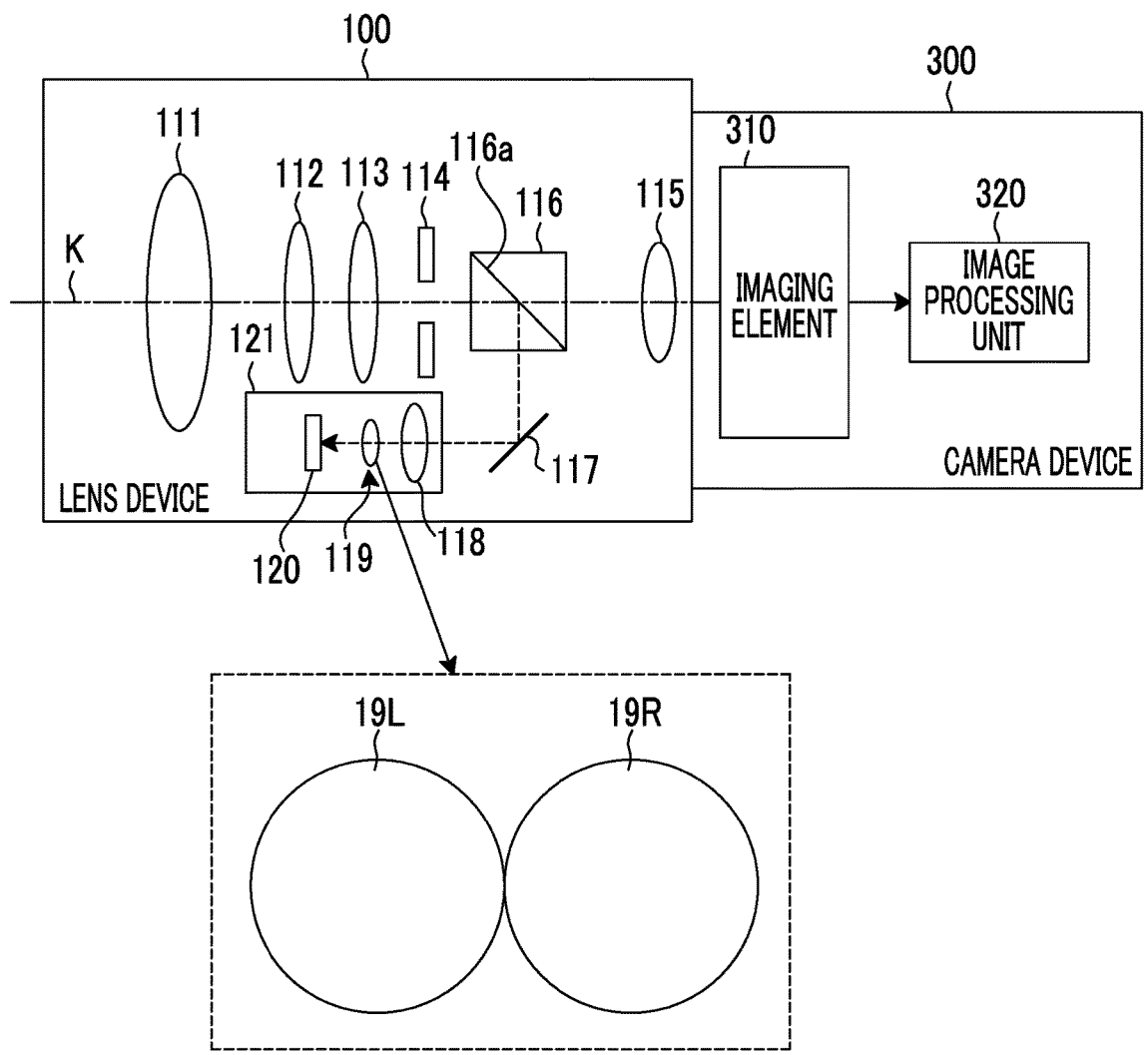
FIG. 21 is a diagram showing the schematic configuration of a camera system for describing an embodiment of the invention.

FIG. 21 is a diagram showing the schematic configuration of a camera system for describing an embodiment of the invention. The camera system is suitable for camera systems for business such as broadcasting or movie.

The camera system shown in FIG. 21 includes a lens device 100 and a camera device 300 as an imaging device to which the lens device 100 is attached.

The lens device 100 includes a focus lens 111, zoom lens 112 and 113, a stop 114, and a master lens group 115, and these lenses are arranged in a line in order from the lens close to the subject.

The focus lens 111, the zoom lenses 112 and 113, the stop 114, and the master lens group 115 constitute the imaging optical system. The imaging optical system includes at least the focus lens 111.

The lens device 100 further includes a beam splitter 116 including a reflection surface 116a, a mirror 117, a condenser lens 118, a separator lens 119, and an AF unit 121 including an imaging element 120. The imaging element 120 is an image sensor such as a CMOS type image sensor or a CCD type image sensor including a plurality of pixels arranged in a two-dimensional shape.

The beam splitter 116 is disposed between the stop 114 and the master lens group 115 on an optical axis K. The beam splitter 116 transmits some (for example, 80% of the subject light rays) of subject light rays which are incident on the imaging optical system and pass through the stop 114, and reflects the remaining light rays (for example, 20% of the subject light rays) acquired by subtracting the some of the subject light rays from the reflection surface 116a in a direction perpendicular to the optical axis K. The position of the beam splitter 116 is not limited to the position shown in FIG. 19, and the beam splitter may be positioned behind the lens of the imaging optical system closest to the subject on the optical axis K.

The mirror 117 is disposed on an optical path of the light rays reflected from the reflection surface 116a of the beam splitter 116. Thus, the light rays are reflected, and are incident on the condenser lens 118 of the AF unit 121.

The condenser lens 118 concentrates the light rays reflected from the mirror 117.

As shown as an enlarged front view surrounded by a dashed line in FIG. 21, the separator lens 119 is composed of two lenses 19R and 19L arranged in a line in a direction (a horizontal direction in the example of FIG. 21) with an optical axis of the imaging optical system interposed therebetween.

The subject light rays concentrated by the condenser lens 118 pass through the two lenses 19R and 19L, and form images in different positions on a light reception surface (a surface on which a plurality of pixels is formed) of the imaging element 120. That is, a pair of subject light images shifted in one direction and a pair of subject light images shifted in direction perpendicular to the one direction are formed on the light reception surface of the imaging element 120.

The beam splitter 116, the mirror 117, the condenser lens 118, and the separator lens 119 function as an optical element that causes some of the subject light rays incident on the imaging optical system to be incident on an imaging element 310 of the camera device 300 that images the subject light images through the imaging optical system and causes the remaining subject light rays acquired by removing the some of the subject light rays to be incident on the imaging element 120. The mirror 117 may be removed, and the light rays reflected by the beam splitter 116 may be directly incident on the condenser lens 118.

The imaging element 120 is an area sensor in which a plurality of pixels is arranged on a light reception surface in a two-dimensional shape, and outputs image signals corresponding to the two subject light images formed on the light reception surface. That is, the imaging element 120 outputs a pair of image signals shift in a horizontal direction from one subject light image formed by the imaging optical system. It is possible to avoid a difficulty in precisely adjusting a position between line sensors by using the area sensor as the imaging element 120 compared to a case where the line sensors are used.

Among the pixels included in the imaging element 120, the pixel that outputs one of the pair of image signals shifted in the horizontal direction constitutes the first signal detection section that receives one luminous flux of the pair of luminous fluxes passing through two different portions arranged in the horizontal direction of the pupil region of the imaging optical system and detects the signal corresponding to the a light reception amount.

Among the pixels included in the imaging element 120, the pixel that outputs the other one of the pair of image signals shifted in the horizontal direction constitutes a second signal detection section that receives the other luminous flux of the pair of luminous fluxes passing through the two different portions arranged in the horizontal direction of the pupil region of the imaging optical system and detects the signal corresponding to the a light reception amount.

Although the area sensor is used as the imaging element 120, a line sensor in which the plurality of pixels constituting the first signal detection section is arranged in the horizontal direction may be disposed in a position facing the lens 19R and a line sensor in which the plurality of pixels constituting the second signal detection section is arranged in the horizontal direction may be disposed in a position facing the lens 19L, instead of the imaging element 120.

The camera device 300 includes the imaging element 310 such as a CCD type image sensor or a CMOS type image sensor disposed on the optical axis K of the lens device 100, and an image processing unit 320 that generates captured image data by processing image signals acquired by imaging the subject light images by the imaging element 310.

The block configuration of the lens device 100 is the same as the lens device of FIG. 1, and includes a drive unit that drives the focus lens and a control unit that controls the drive unit. The control unit functions as an one of system control units 11A, 11B, and 11C.

However, the first signal group and the second signal group input to the control unit are signals output from the first signal detection section and the second signal detection section of the imaging element 120. In the camera system, the control unit of the lens device 100 functions as the focusing control device.

The camera system for business is basically used for imaging the moving image. Thus, the focusing control using the system control units 11, 11A, 11B, and 11C of the digital camera described in FIGS. 1 to 20 is particularly effective.

Although it has been described above that the digital camera is used as the camera system for broadcasting, an embodiment of a smartphone with a camera as the imaging device will be described below.

Figure 22:
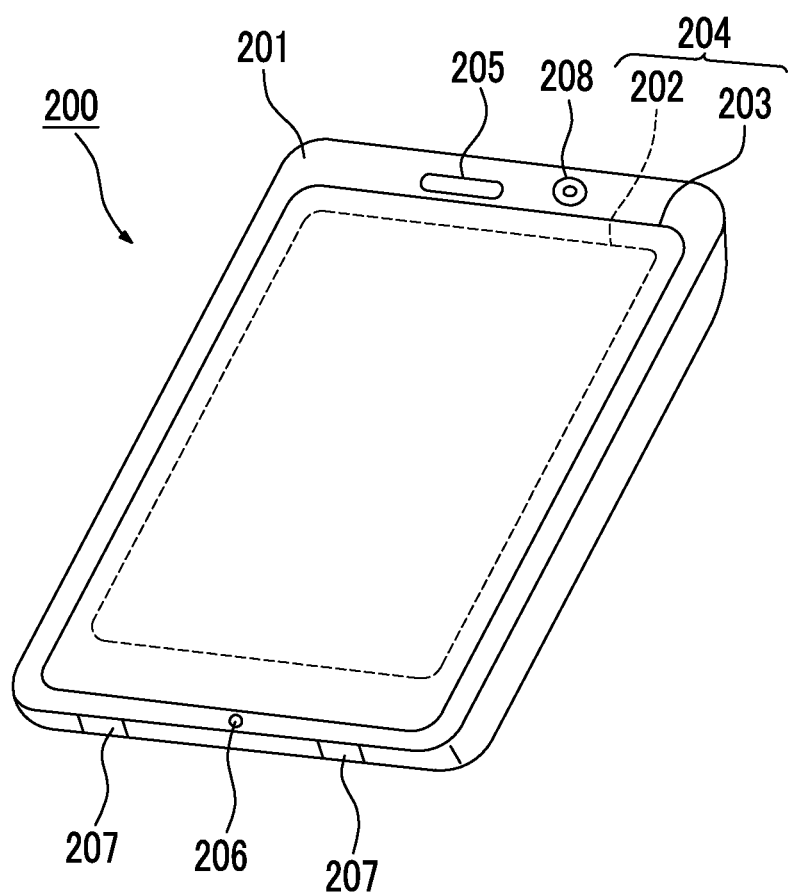
FIG. 22 shows the appearance of a smartphone 200 which is an embodiment of an imaging device of the invention.

FIG. 22 shows the appearance of a smartphone 200 which is an embodiment of an imaging device of the invention. The smartphone 200 shown in FIG. 22 has a flat plate-shaped housing 201, and includes a display input unit 204 in which a display panel 202 as a display unit on one surface of the housing 201 and an operation panel 203 as an input unit are integrated. The housing 201 includes a speaker 205, a microphone 206, an operating unit 207, and a camera unit 208.

The configuration of the housing 201 is not limited thereto, and for example, a configuration in which the display unit and the input unit are independent from each other may be employed, or a configuration having a folding structure or a slide mechanism may be employed.

Figure 23:
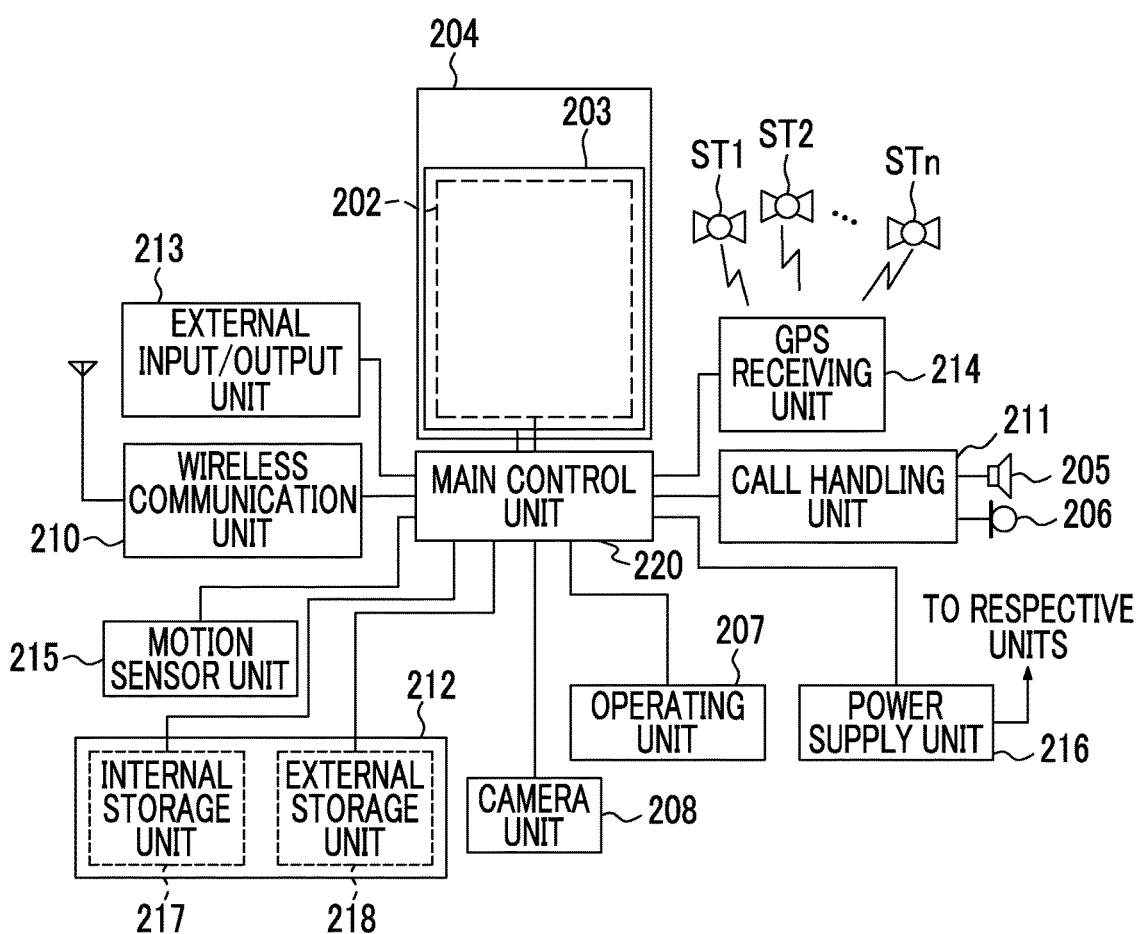
FIG. 23 is a block diagram showing the configuration of the smartphone 200 shown in FIG. 22.

FIG. 23 is a block diagram showing the configuration of the smartphone 200 shown in FIG. 22. As shown in FIG. 23, principal components of the smartphone include a wireless communication unit 210, a display input unit 204, a call handling unit 211, an operating unit 207, a camera unit 208, a storage unit 212, an external input/output unit 213, a global positioning system (GPS) receiving unit 214, a motion sensor unit 215, a power supply unit 216, and a main control unit 220. Principal functions of the smartphone 200 include a wireless communication function of performing mobile wireless communication through a base station device BS (not shown) through a mobile communication network NW (not shown).

The wireless communication unit 210 performs wireless communication with a base station device BS in the mobile communication network NW according to an instruction of the main control unit 220. With the use of the wireless communication, transmission and reception of various kinds of file data, such as voice data and image data, and electronic mail data, or reception of Web data, streaming data, or the like are performed.

The display input unit 204 is a so-called touch panel which displays images (still images and moving images) or character information, or the like to visually transfer information to the user and detects a user's operation on the displayed information under the control of the main control unit 220, and includes the display panel 202 and the operation panel 203.

The display panel 202 uses a liquid crystal display (LCD), an organic electro-luminescence display (OLED), or the like as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main control unit 220. Next, the main control unit 220 detects an operation position (coordinates) on the display panel 202 based on the received detection signal.

As shown in FIG. 22, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may include a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not necessary to match both of the size of the display region and the size of the display panel. The operation panel 203 may include two sensitive regions including an outer edge portion and an inner portion other than the outer edge portion. The width of the outer edge portion is appropriately designed according to the size of the housing 201 or the like. As a position detection system which is employed in the operation panel 203, a matrix switching system, a resistive film system, a surface acoustic wave system, an infrared system, an electromagnetic induction system, an electrostatic capacitance system, and the like are exemplified, and any system can be employed.

The call handling unit 211 includes the speaker 205 and the microphone 206, converts voice of the user input through the microphone 206 to voice data processable in the main control unit 220 and outputs voice data to the main control unit 220, or decodes voice data received by the wireless communication unit 210 or the external input/output unit 213 and outputs voice from the speaker 205. As shown in FIG. 22, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives an instruction from the user. For example, as shown in FIG. 22, the operating unit 207 is a push button-type switch which is mounted on the side surface of the housing 201 of the smartphone 200, and is turned on by being depressed with a finger or the like and is turned off by restoration force of the panel or the like in a case where the finger is released.

The storage unit 212 stores a control program or control data of the main control unit 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for a detachable external memory.

The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (Infrared Data Association: IrDA) (Registered Trademark), Ultra Wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, a PDA connected in a wired or wireless manner, an earphone connected in a wired or wireless manner, and the like.

The external input/output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to an instruction of the main control unit 220, executes positioning calculation processing based on a plurality of received GPS signals, and detects the position of the smartphone 200 having latitude, longitude, and altitude. In a case where positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to an instruction of the main control unit 220. The moving direction or acceleration of the smartphone 200 is detected by detecting physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling respective units of a communication system in order to perform voice communication or data communication through the wireless communication unit 210, and an application processing function.

The application processing function is realized by the main control unit 220 operating according to application software stored in the storage unit 212. The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main control unit 220 has an image processing function of displaying video on the display input unit 204, or the like based on image data (still image or moving image data), such as received data or downloaded streaming data. The image processing function refers to a function of the main control unit 220 decoding image data, performing image processing on the decoding result, and displaying an image on the display input unit 204.

The main control unit 220 executes display control on the display panel 202 and operation detection control for detecting a user's operation through the operating unit 207 and the operation panel 203. With the execution of the display control, the main control unit 220 displays an icon for activating application software or a software key, such as a scroll bar, or displays a window for creating electronic mail. The scroll bar refers to a software key for receiving an instruction to move a display portion of an image which is too large to fit into the display region of the display panel 202.

With the execution of the operation detection control, the main control unit 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main control unit 220 has a touch panel control function of determining whether an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than the external memory control unit 20, the recording medium 21, the display control unit 22, the display unit 23, and the operating unit 14 in the digital camera shown in FIG. 1.

Captured image data generated by the camera unit 208 can be recorded in the storage unit 212 or can be output through the external input/output unit 213 or the wireless communication unit 210.

In the smartphone 200 shown in FIG. 22, although the camera unit 208 is mounted on the same surface as the display input unit 204, the mounting position of the camera unit 208 is not limited thereto, and the camera unit 208 may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main control unit or the like) acquired by the microphone 206, posture information acquired by the motion sensor unit 215, or the like and can be recorded in the storage unit 212, or may be output through the external input/output unit 213 or the wireless communication unit 210.

In the smartphone 200 having the aforementioned configuration, it is possible to perform high-accurate focusing control by providing an accessory to which the lens device 40 is able to be detachably attached, using the imaging element 5 as the imaging element of the camera unit 208, and performing the process shown in FIG. 9, 10, 13, 14, 15, 17, 19, or 20.

As described above, the following matters are disclosed in this specification.

Disclosed is a focusing control device comprising a plurality of signal detection sections that receives luminous fluxes passing through an imaging optical system including a focus lens capable of moving in an optical axis direction in a first range and detects signals corresponding to light reception amounts, a movement allowable range control unit that controls a movement allowable range in which movement of the focus lens set in the first range is allowed, and a lens driving control unit that moves the focus lens within the movement allowable range controlled by the movement allowable range control unit based on a signal group output from the plurality of signal detection sections.

In the disclosed focusing control device, the plurality of signal detection sections includes a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, the focusing control device further includes a phase difference measurement unit that measures a phase difference amount between a first signal group output from the plurality of first signal detection sections and a second signal group output from the plurality of second signal detection sections, the lens driving control unit moves the focus lens within the movement allowable range based on the phase difference amount, and the movement allowable range control unit widens the movement allowable range as a difference between a first position of the focus lens before the focus lens moves based on the phase difference amount and a target focusing position of the focus lens based on the phase difference amount becomes larger.

In the disclosed focusing control device, the movement allowable range control unit sets front and rear ranges in the optical axis direction with the first position as a starting point, as the movement allowable range, and sets the range closer to one direction in the optical axis direction of the imaging optical system than the first position to be wider than the range closer to the other one direction in the optical axis direction than the first position in a case where a state in which the target focusing position is closer to the one direction than the first position is continued by a threshold number of times or more.

The disclosed focusing control device further comprises a depth-of-field information acquisition unit that acquires information of depth of field of the imaging optical system. The movement allowable range control unit widens the movement allowable range as the depth of field based on the information becomes shallower.

In the disclosed focusing control device, the imaging optical system includes a stop, and the depth-of-field information acquisition unit acquires an F number of the stop, as the information of the depth of field.

In the disclosed focusing control device, the imaging optical system includes a zoom lens for changing a focal length, and the depth-of-field information acquisition unit acquires the focal length of the imaging optical system, as the information of the depth of field.

In the disclosed focusing control device, the plurality of signal detection sections includes a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, the focusing control device further includes a phase difference measurement unit that measures a phase difference amount between a first signal group output from the plurality of first signal detection sections and a second signal group output from the plurality of second signal detection sections, the lens driving control unit moves the focus lens within the movement allowable range based on the phase difference amount, and the depth-of-field information acquisition unit calculates a subject distance based on the phase difference amount, and acquires the calculated subject distance, as the information of the depth of field.

In the disclosed focusing control device, the movement allowable range control unit acquires captured image data captured by an imaging element which images a subject through the imaging optical system, recognizes the subject captured by the plurality of signal detection sections based on the captured image data, and further narrows the movement allowable range in a case where a subject other than a target subject is recognized compared to a case where only the target subject is recognized.

The disclosed focusing control device further comprises an imaging range change detection unit that detects a change of an imaging range by means of the imaging optical system. The movement allowable range control unit controls the movement allowable range based on a state of the change of the imaging range detected by the imaging range change detection unit.

In the disclosed focusing control device, the movement allowable range control unit further widens the movement allowable range in a case where a change amount of the imaging range detected by the imaging range change detection unit is equal to or greater than a range threshold value compared to a case where the change amount of the imaging range is less than the range threshold value.

In the disclosed focusing control device, the movement allowable range control unit sets the movement allowable range to the first range in a case where the change amount of the imaging range is equal to or greater than the range threshold value.

In the disclosed focusing control device, the movement allowable range control unit further widens the movement allowable range in a case where a change rate of the imaging range detected by the imaging range change detection unit is equal to or greater than a rate threshold value compared to a case where the change rate of the imaging range is less than the rate threshold value.

In the disclosed focusing control device, the movement allowable range control unit sets the movement allowable range to the first range in a case where the change rate of the imaging range is equal to or greater than the rate threshold value.

Disclosed is a lens device comprising the focusing control device; and an imaging optical system including a focus lens for causing light rays to be incident on the plurality of signal detection sections.

Disclosed is an imaging device comprising the focusing control device.

Disclosed is a focusing control method of controlling a position of a focus lens capable of moving in an optical axis direction in a first range by using a plurality of signal detection sections which receives luminous fluxes passing through an imaging optical system including the focus lens and detects signals corresponding to light reception amounts. The method comprises a movement allowable range control step of controlling a movement allowable range in which movement of the focus lens set in the first range is allowed, and a lens driving control step of moving the focus lens within the movement allowable range controlled in the movement allowable range control step based on a signal group output from the plurality of signal detection sections.

In the disclosed focusing control method, the plurality of signal detection sections includes a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, the focusing control method further includes a phase difference measurement step of measuring a phase difference amount between a first signal group output from the plurality of first signal detection sections and a second signal group output from the plurality of second signal detection sections, in the lens driving control step, the focus lens moves within the movement allowable range based on the phase difference amount, in the movement allowable range control step, the movement allowable range is widened as a difference between a first position of the focus lens before the focus lens moves based on the phase difference amount and a target focusing position of the focus lens based on the phase difference amount becomes larger.

In the disclosed focusing control method, in the movement allowable range control step, front and rear ranges in the optical axis direction with the first position as a starting point are set as the movement allowable range, and the range closer to one direction in the optical axis direction of the imaging optical system than the first position is set to be wider than the range closer to the other one direction in the optical axis direction than the first position in a case where a state in which the target focusing position is closer to the one direction than the first position is continued by a threshold number of times or more.

The disclosed focusing control method further comprises a depth-of-field information acquisition step of acquiring information of depth of field of the imaging optical system. In the movement allowable range control step, the movement allowable range is widened as the depth of field based on the information becomes shallower.

In the disclosed focusing control method, the imaging optical system includes a stop, and in the depth-of-field information acquisition step, an F number of the stop is acquired as the information of the depth of field.

In the disclosed focusing control method, the imaging optical system includes a zoom lens for changing a focal length, and in the depth-of-field information acquisition step, the focal length of the imaging optical system is acquired as the information of the depth of field.

In the disclosed focusing control method, the plurality of signal detection sections includes a plurality of first signal detection sections which receives one of a pair of luminous fluxes passing through different portions arranged in one direction of a pupil region of the imaging optical system and detects signals corresponding to light reception amounts and a plurality of second signal detection sections which receives the other one of the pair of luminous fluxes and detects signals corresponding to light reception amounts, the focusing control method further includes a phase difference measurement step of measuring a phase difference amount between a first signal group output from the plurality of first signal detection sections and a second signal group output from the plurality of second signal detection sections and a subject distance calculation step of calculating a subject distance based on the phase difference amount, in the lens driving control step, the focus lens moves within the movement allowable range based on the phase difference amount, and in the depth-of-field information acquisition step, the subject distance calculated in the subject distance calculation step is acquired as the information of the depth of field.

In the focusing control method, in the movement allowable range control step, captured image data captured by an imaging element which images a subject through the imaging optical system is acquired, the subject captured by the plurality of signal detection sections is recognized based on the captured image data, and the movement allowable range is further narrowed in a case where a subject other than a target subject is recognized compared to a case where only the target subject is recognized.

The focusing control method further comprises an imaging range change detection step of detecting a change of an imaging range by means of the imaging optical system. In the movement allowable range control step, the movement allowable range is controlled based on a state of the change of the imaging range detected in the imaging range change detection step.

In the disclosed focusing control method, in the movement allowable range control step, the movement allowable range is further widened in a case where a change amount of the imaging range detected in the imaging range change detection step is equal to or greater than a range threshold value compared to a case where the change amount of the imaging range is less than the range threshold value.

In the disclosed focusing control method, in the movement allowable range control step, the movement allowable range is set to the first range in a case where the change amount of the imaging range is equal to or greater than the range threshold value.

In the disclosed focusing control method, in the movement allowable range control step, the movement allowable range is further widened in a case where a change rate of the imaging range detected in the imaging range change detection step is equal to or greater than a rate threshold value compared to a case where the change rate of the imaging range is less than the rate threshold value.

In the disclosed focusing control method, in the movement allowable range control step, the movement allowable range is set to the first range in a case where the change rate of the imaging range is equal to or greater than the rate threshold value.

Disclosed is a focusing control program causes a computer to perform a focusing control method of controlling a position of a focus lens capable of moving in an optical axis direction in a first range by using a plurality of signal detection sections which receives luminous fluxes passing through an imaging optical system including the focus lens and detects signals corresponding to light reception amounts. The method comprises a movement allowable range control step of controlling a movement allowable range in which movement of the focus lens set in the first range is allowed, and a lens driving control step of moving the focus lens within the movement allowable range controlled in the movement allowable range control step based on a signal group output from the plurality of signal detection sections.

The invention is applied to a television camera for broadcasting, a digital camera, or the like, thereby achieving high convenience and effectiveness.

Although the invention has been described above by a specific embodiment, the invention is not limited to the embodiment, and various modifications may be made without departing from the technical spirit of the invention disclosed herein.

This application is based on Japanese Patent Application (2015-194238), filed Sep. 30, 2015, the content of which is incorporated herein.

EXPLANATION OF REFERENCES

1: imaging lens
2: stop
4: lens control unit
40: lens device
5: imaging element
50: light reception surface
51: pixel
52, 52A, 52B: phase difference detection pixel
53: focus detection area
c: opening
X: row direction
Y: column direction
6: analog signal processing unit
7: analog-to-digital conversion circuit
8: lens drive unit
9: stop drive unit
10: imaging element drive unit
11, 11A, 11B, 11C: system control unit
11a: phase difference measurement unit
11b, 11bA, 11bB, 11bC: movement allowable range control unit
11c: lens driving control unit
11d: depth-of-field information acquisition unit
11g: imaging range change detection unit
14: operating unit
15: memory control unit
16: main memory
17: digital signal processing unit
18: compression/decompression processing unit
20: external memory control unit
21: recording medium
22: display control unit
23: display unit
24: control bus
25: data bus
x(1) to x(10): target focusing position
100: lens device
111: focus lens
112, 113: zoom lens
114: stop
115: master lens group
116: beam splitter
116a: reflection surface
117: mirror
118: condenser lens
119: separator lens
19L, 19R: lens
120: imaging element
121: unit
300: camera device
310: imaging element
320: image processing unit
K: optical axis
200: smartphone
201: housing
202: display panel
203: operation panel
204: display input unit
205: speaker
206: microphone
207: operating unit
208: camera unit
210: wireless communication unit
211: call handling unit
212: storage unit
213: external input/output unit
214: GPS receiving unit
215: motion sensor unit
216: power supply unit
217: internal storage unit
218: external storage unit
220: main control unit
ST1 to STn: GPS satellite

What is claimed is:

1. A focusing control device comprising:
a plurality of signal detection sections that receives luminous fluxes passing through an imaging optical system including a focus lens capable of moving in an optical axis direction in a first range and detects signals corresponding to light reception amounts;
a movement allowable range control unit that controls a movement allowable range in which movement of the focus lens set in the first range is allowed; and
a lens driving control unit that moves the focus lens within the movement allowable range controlled by the movement allowable range control unit based on a signal group output from the plurality of signal detection sections,
wherein the movement allowable range control unit acquires captured image data captured by an imaging element which images a subject through the imaging optical system, recognizes the subject captured by the plurality of signal detection sections based on the captured image data, and further narrows the movement allowable range in a case where a subject other than a target subject is recognized compared to a case where only the target subject is recognized.

2. A lens device comprising:
the focusing control device according to claim 1; and
an imaging optical system comprising a focus lens for causing light rays to be incident on the plurality of signal detection sections.

3. An imaging device comprising the focusing control device according to claim 1.

4. A focusing control method of controlling a position of a focus lens capable of moving in an optical axis direction in a first range by using a plurality of signal detection sections which receives luminous fluxes passing through an imaging optical system including the focus lens and detects signals corresponding to light reception amounts, the method comprising:
a movement allowable range control step of controlling a movement allowable range in which movement of the focus lens set in the first range is allowed; and
a lens driving control step of moving the focus lens within the movement allowable range controlled in the movement allowable range control step based on a signal group output from the plurality of signal detection sections,
wherein, in the movement allowable range control step, captured image data captured by an imaging element which images a subject through the imaging optical system is acquired, the subject captured by the plurality of signal detection sections is recognized based on the captured image data, and the movement allowable range is further narrowed in a case where a subject other than a target subject is recognized compared to a case where only the target subject is recognized.

5. A non-transitory computer readable medium storing a focusing control program causing a computer to perform a focusing control method of controlling a position of a focus lens capable of moving in an optical axis direction in a first range by using a plurality of signal detection sections which receives luminous fluxes passing through an imaging optical system including the focus lens and detects signals corresponding to light reception amounts, the method comprising:
a movement allowable range control step of controlling a movement allowable range in which movement of the focus lens set in the first range is allowed;
and a lens driving control step of moving the focus lens within the movement allowable range controlled in the movement allowable range control step based on a signal group output from the plurality of signal detection sections,
wherein, in the movement allowable range control step, captured image data captured by an imaging element which images a subject through the imaging optical system is acquired, the subject captured by the plurality of signal detection sections is recognized based on the captured image data, and the movement allowable range is further narrowed in a case where a subject other than a target subject is recognized compared to a case where only the target subject is recognized.

\* \* \* \* \*